United States Patent [19]

Lawson et al.

[11] 4,144,583
[45] Mar. 13, 1979

[54] SECONDARY STORAGE FACILITY WITH MEANS FOR MONITORING ERROR CONDITIONS

[75] Inventors: Roger E. Lawson, Northboro; Maurice A. Richesson, Stow, both of Mass.

[73] Assignee: Digital Equipment Corporation, Maynard, Mass.

[21] Appl. No.: 804,172

[22] Filed: Jun. 6, 1977

[51] Int. Cl.² .................... G06F 3/04; G06F 13/04; G06F 11/06
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 2,921,293 | 1/1960 | Bartelt | 364/900 |
| 3,568,160 | 3/1971 | Talarczyk | 364/200 |
| 3,911,400 | 10/1975 | Levy | 364/200 |
| 3,990,055 | 11/1976 | Henderson | 364/200 |

*Primary Examiner*—James D. Thomas
*Attorney, Agent, or Firm*—Cesari & McKenna

[57] ABSTRACT

A drive for use in a secondary storage facility that includes a controller and a drive bus that interconnects the controller and one or more drives. Each drive includes various circuits for monitoring predetermined conditions within the drive and for generating a status signal whenever one of these conditions changes from a normal state. The controller contains circuitry for generating, in a recurring sequence, an address that identifies each drive connected to it. Polling lines of the drive bus convey these addresses to all the drives in parallel. Each drive monitors these polling lines concurrently with other operations it may be performing. When the polling lines identify the drive, the drive examines the status signal and generates an attention signal onto a common attention line that is conveyed back to the controller where it is stored in such a fashion that there is no ambiguity as to the source of the attention signal.

4 Claims, 27 Drawing Figures

DRIVE BUS 15

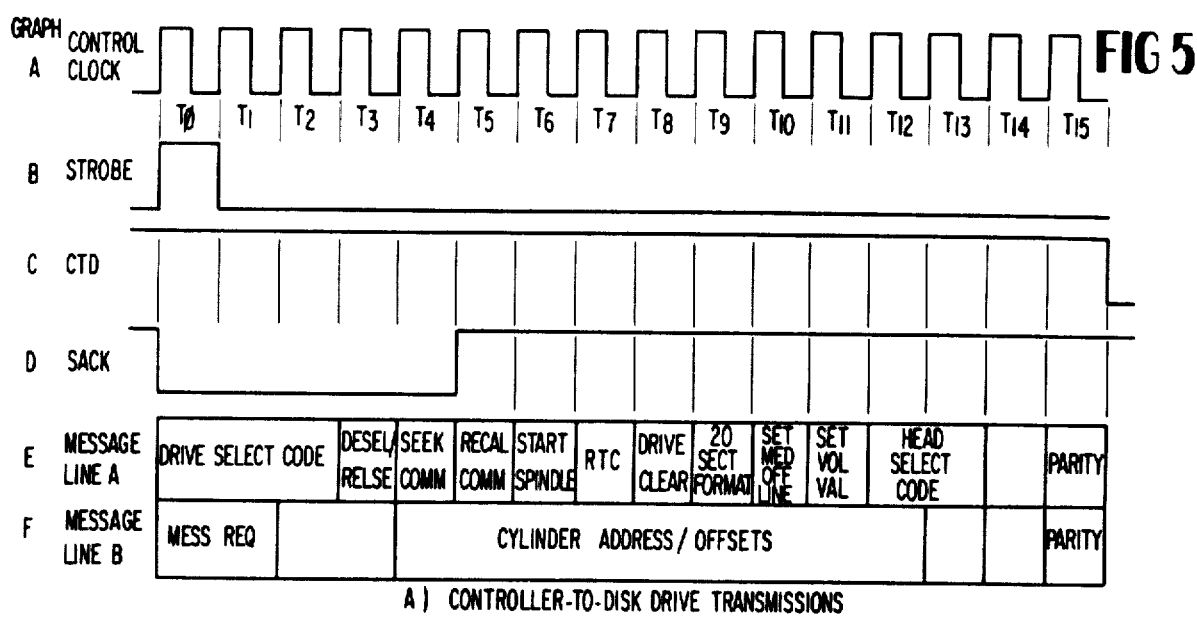
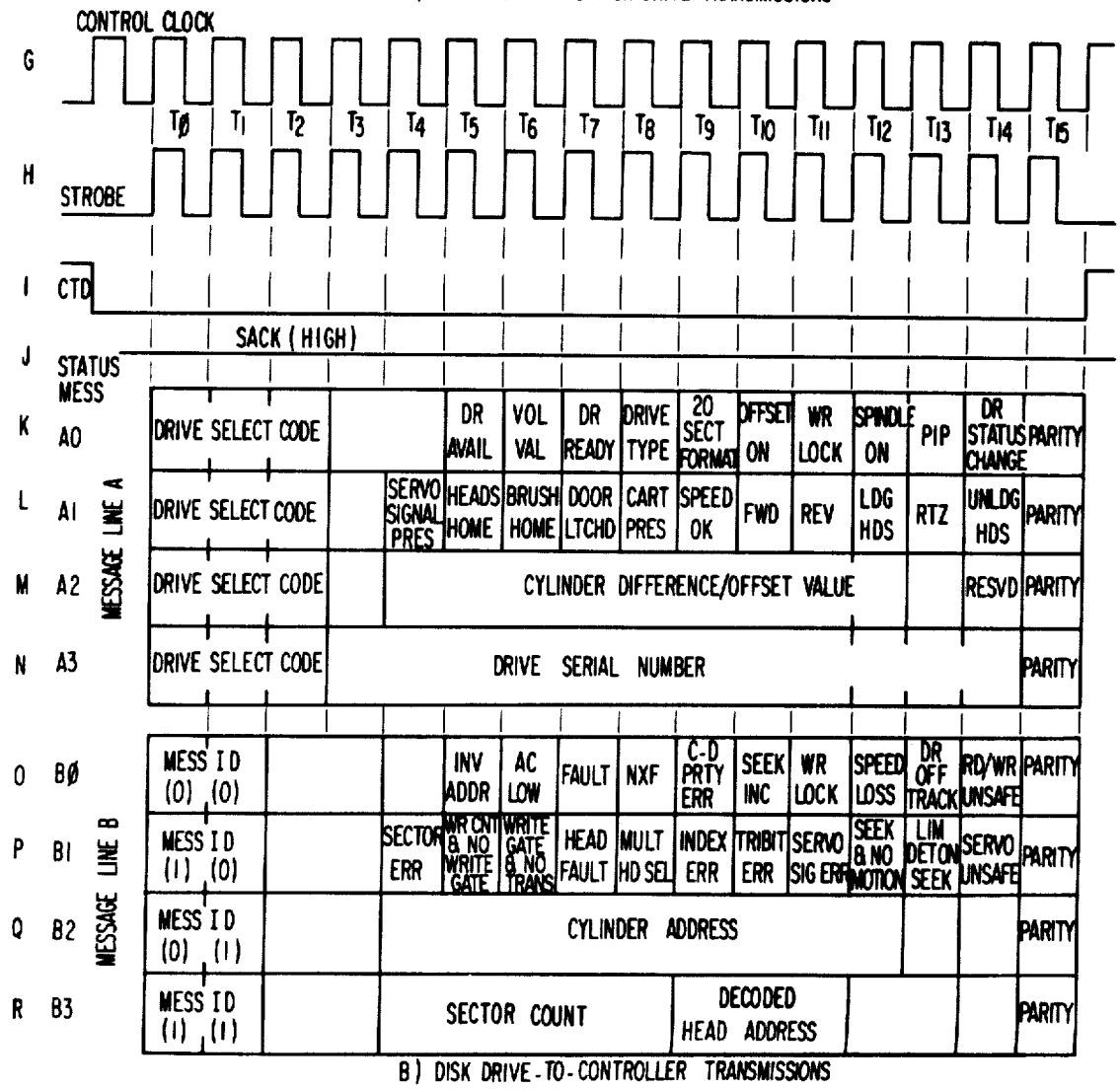
FIG 5

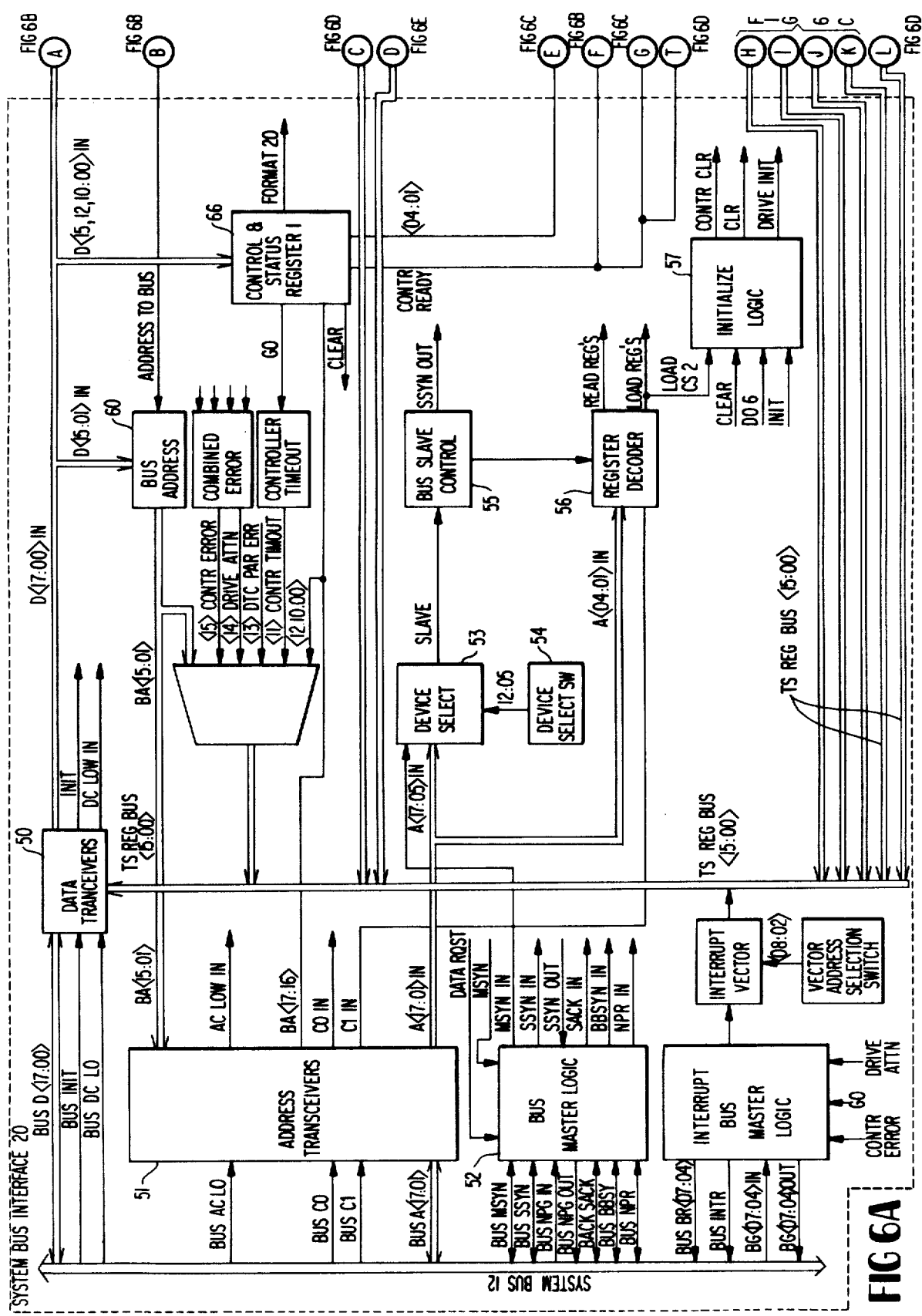

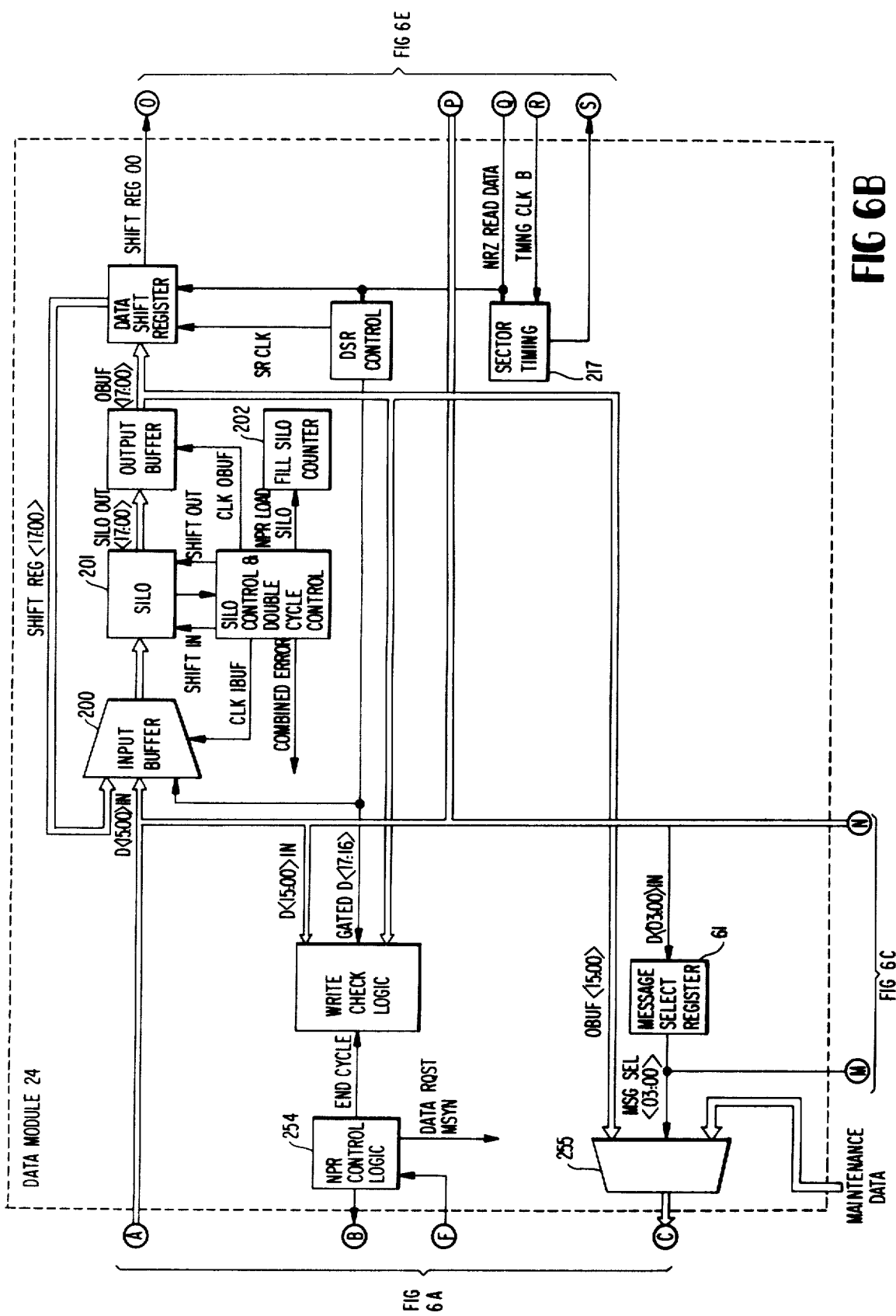

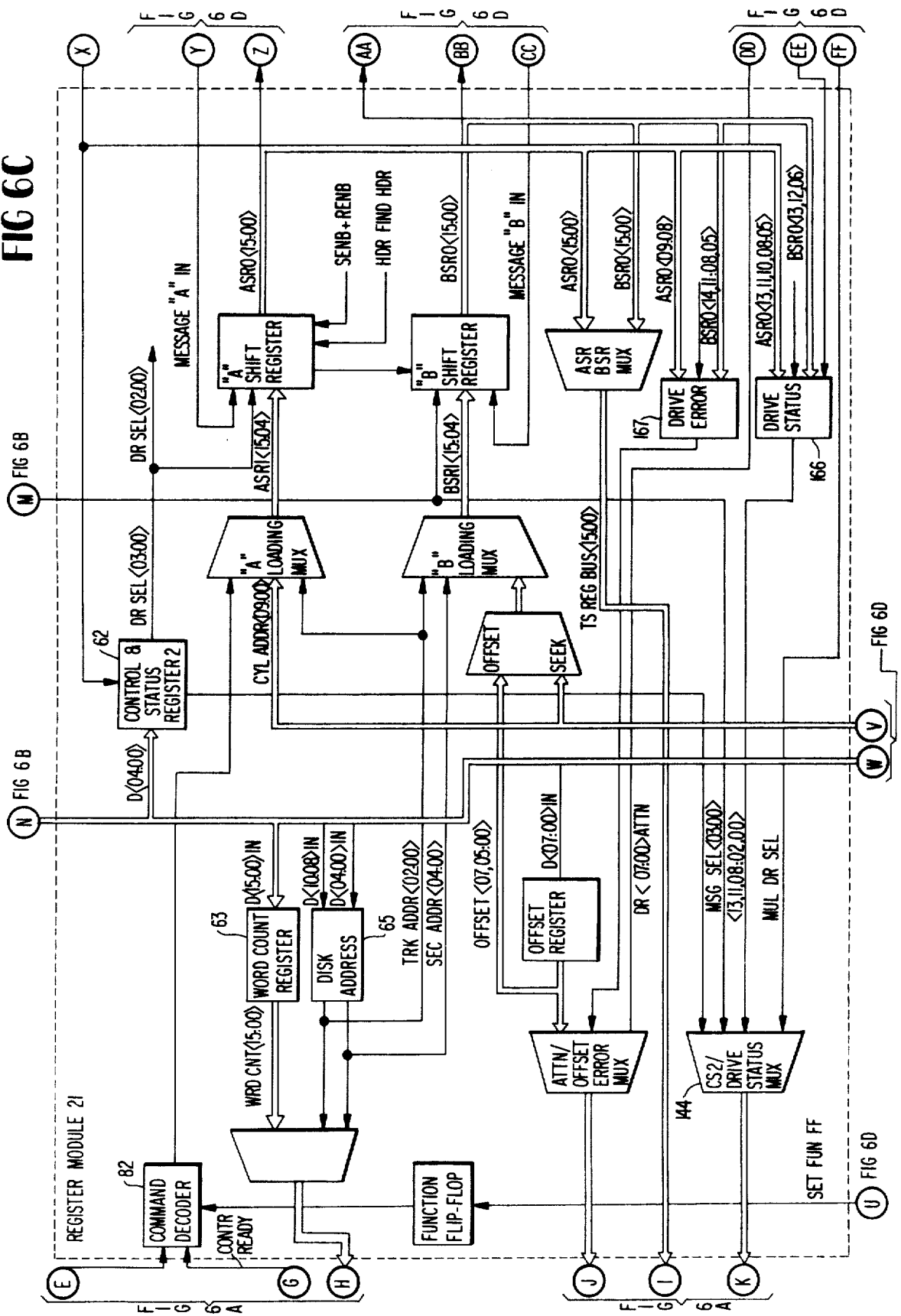

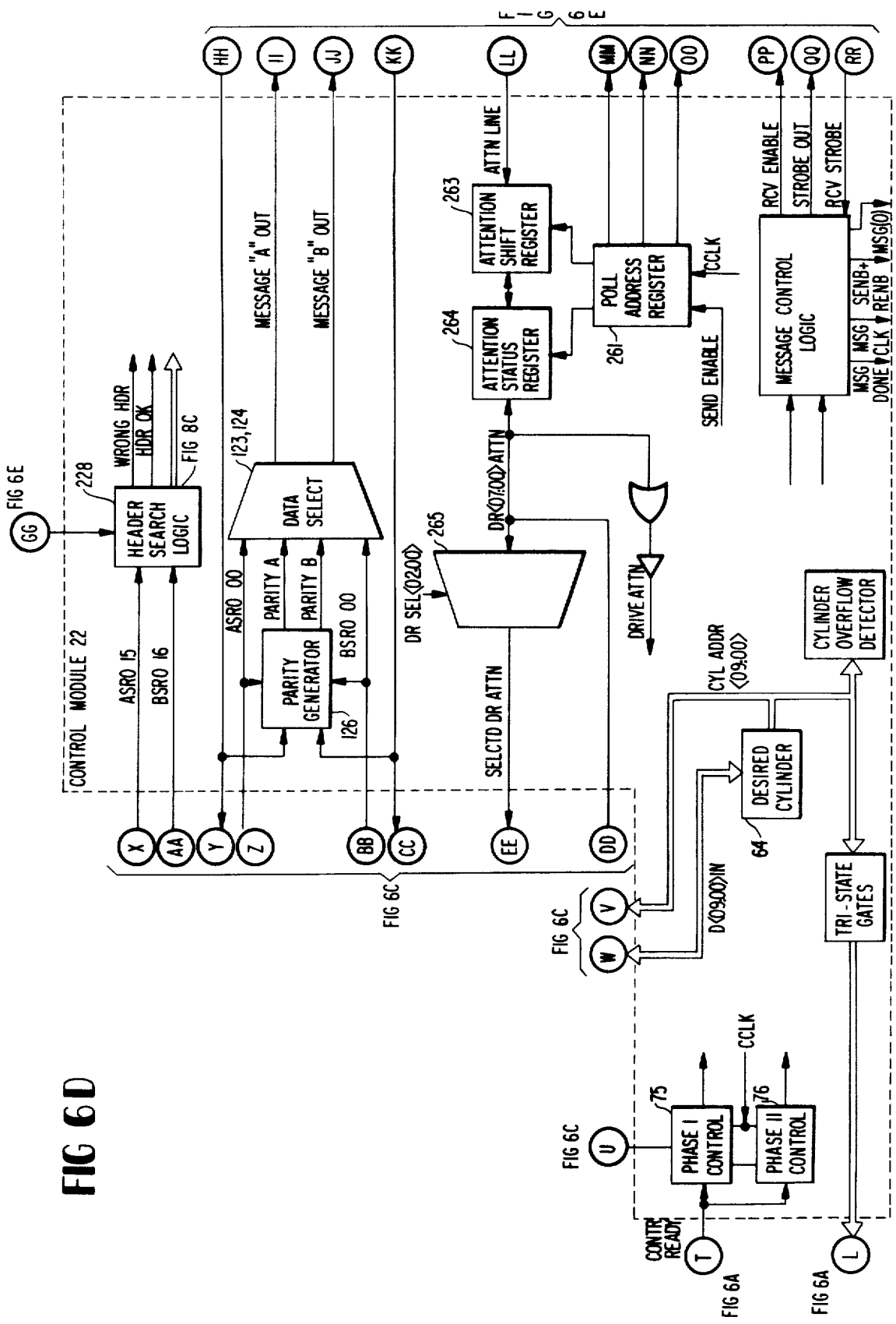

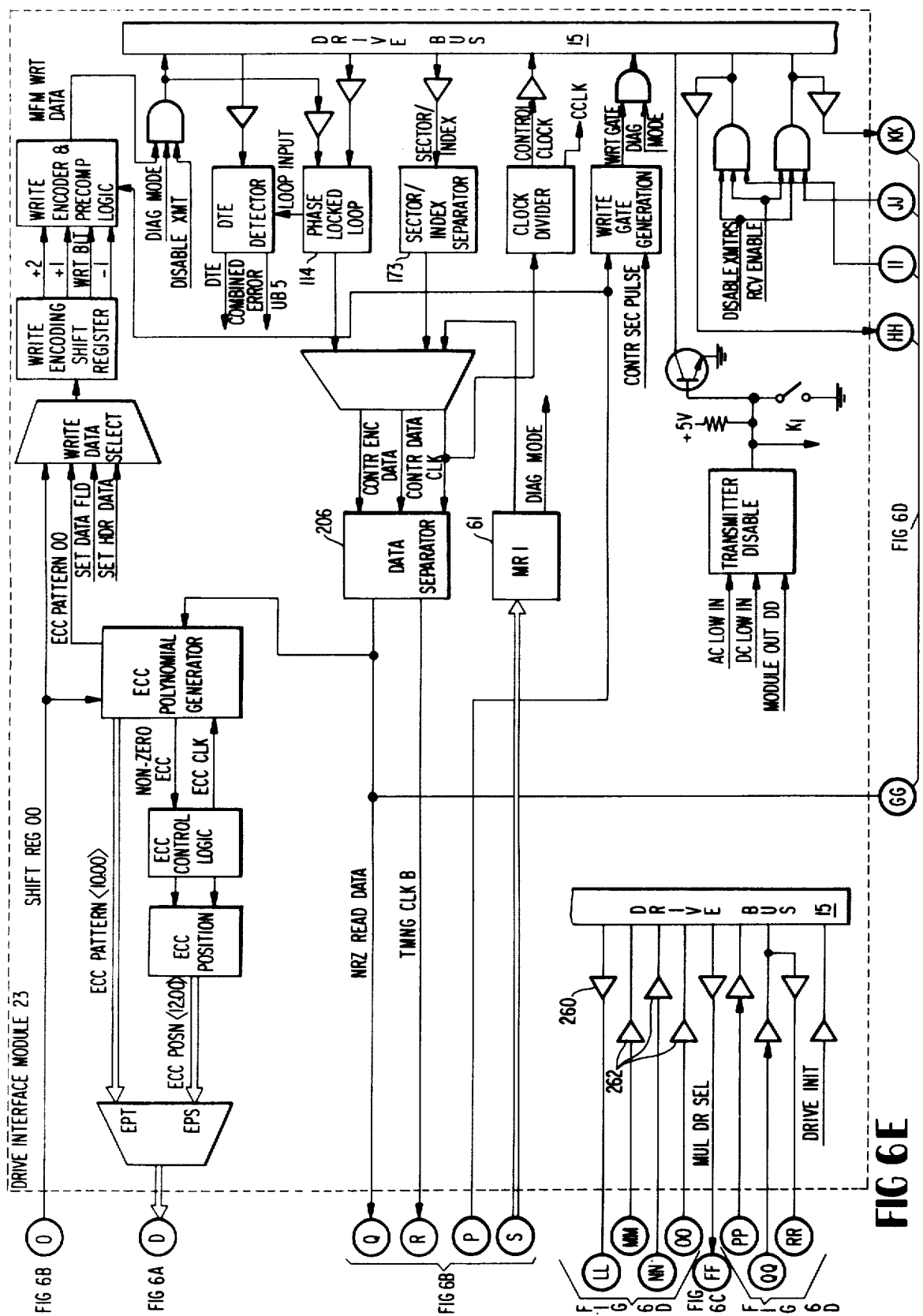

CONTROLLER REGISTERS

CONTROL AND STATUS REGISTER 1 66

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| CERR CCLR | DI | DTC PAR | CFMT | CTO | CDT | BA17 | BA16 | RDY | IE | 0 | F4 | F3 | F2 | F1 | GO |

MAINTENANCE REGISTER 1 61

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| RD GATE | WRT GATE | ECCW | PCD | PCA | MEWD | MERD | MCLK | MIND | MSP | DMD | PAT | MS 3 | MS 2 | MS 1 | MS 0 |

DESIRED CYLINDER REGISTER 64

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| 0 | 0 | 0 | 0 | 0 | 0 | DC 9 | DC 8 | DC 7 | DC 6 | DC 5 | DC 4 | DC 3 | DC 2 | DC 1 | DC 0 |

DISK ADDRESS REGISTER 65

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| 0 | 0 | 0 | 0 | 0 | TA 2 | TA 1 | TA 0 | 0 | 0 | 0 | SA 4 | SA 3 | SA 2 | SA 1 | SA 0 |

CONTROL AND STATUS REGISTER 2 62

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| DLT | WCE | UPE | NED | NEM | PGE | MDS | UFE | OR | IR | SCLR | BAI | RLS | DS 2 | DS 1 | DS 0 |

DRIVE STATUS REGISTER 167

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| SVAL | CDA | PIP | 0 | WRL | 0 | 0 | DDT | DRDY | VV | DROT | SPLS | ACLO | OFST | 0 | DRA |

ERROR REGISTER 166

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| DCK | UNS | OPI | DTE | WLE | IDAE | COE | HVRC | BSE | ECH | DTYE | FMTE | DRPAR | NXF | SKI | ILF |

ATTENTION SUMMARY AND OFFSET REGISTER

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| ATN 7 | ATN 6 | ATN 5 | ATN 4 | ATN 3 | ATN 2 | ATN 1 | ATN 0 | OF 7 | OF 6 | OF 5 | OF 4 | OF 3 | OF 2 | OF 1 | OF 0 |

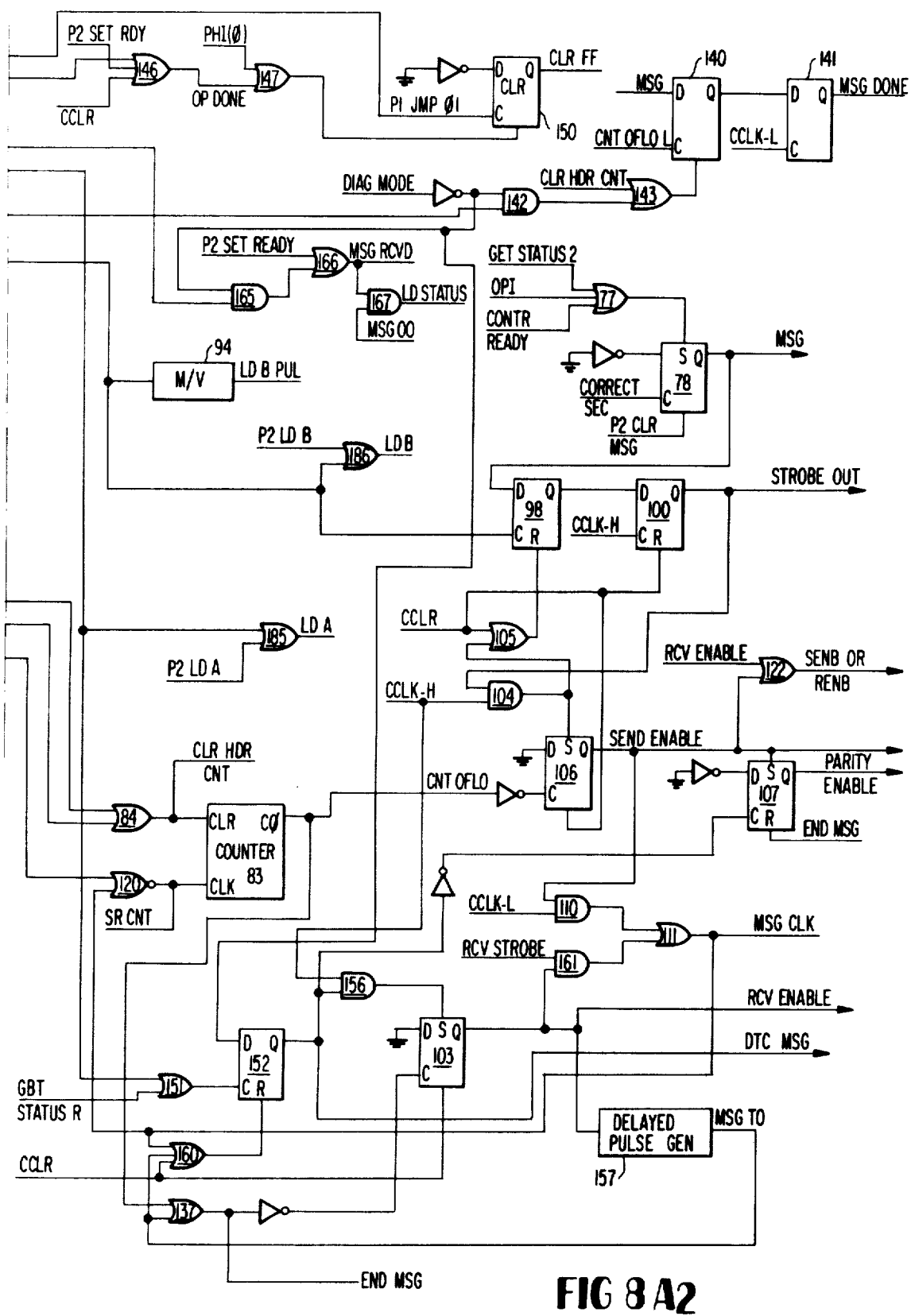
FIG 8 A2

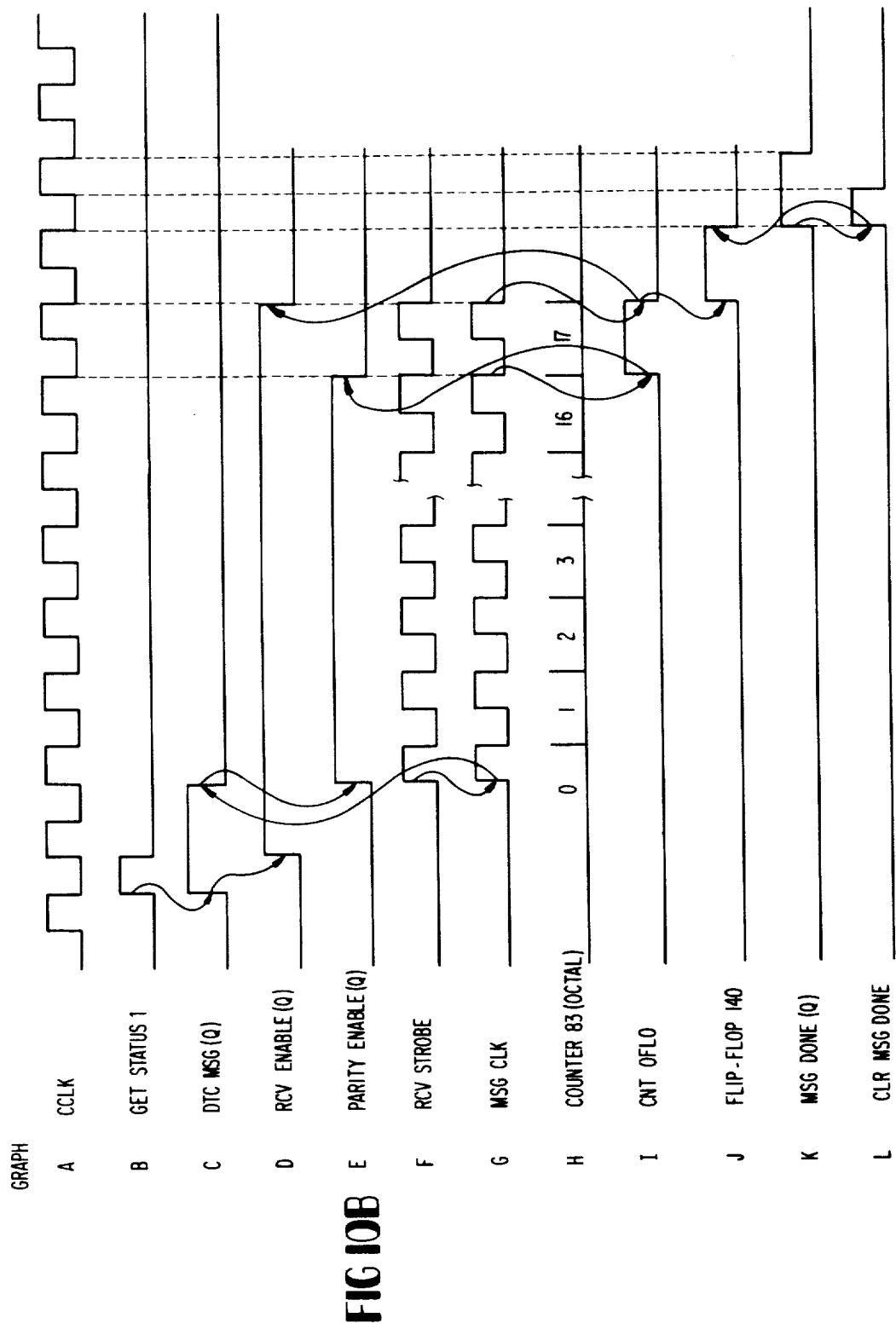

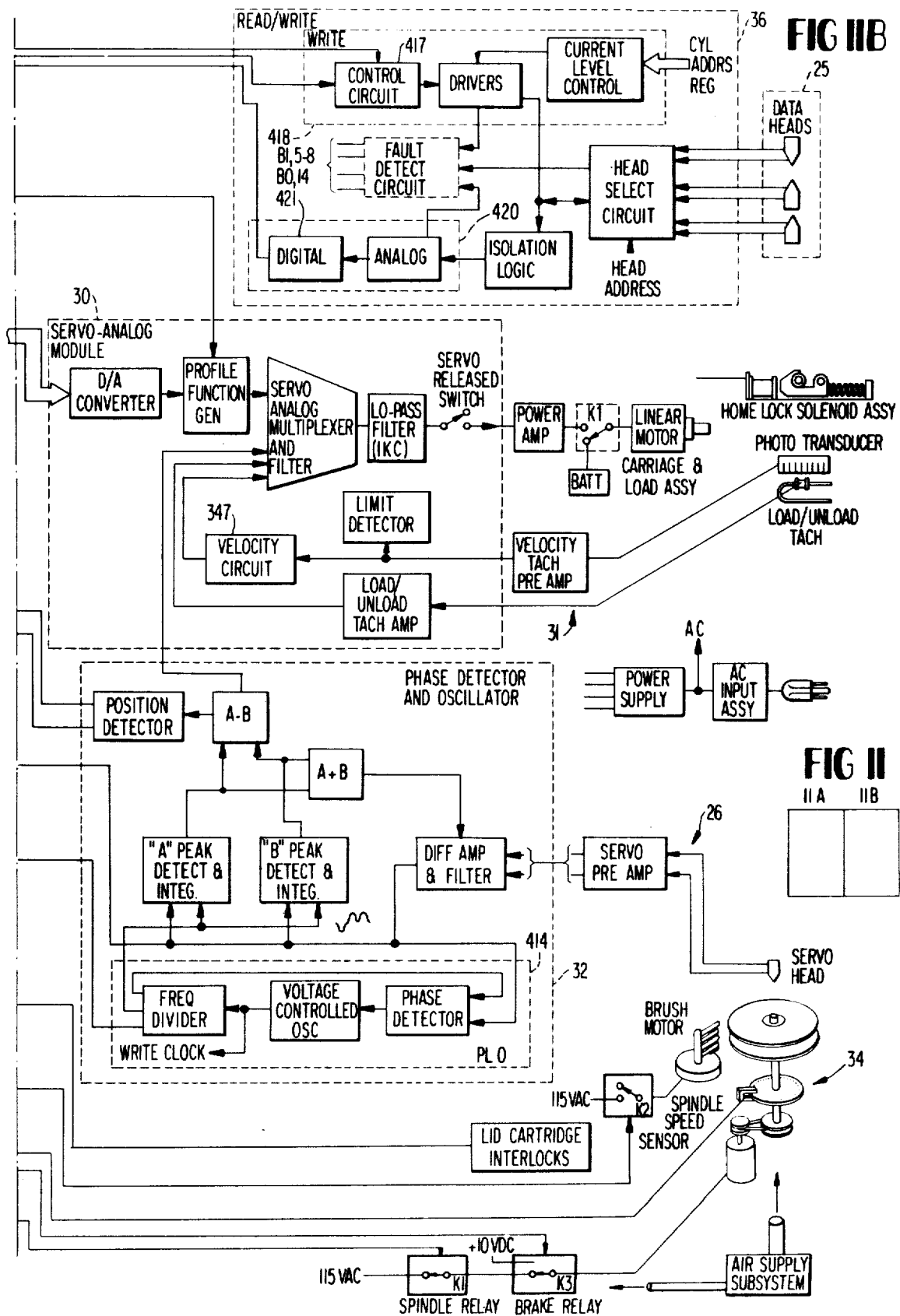

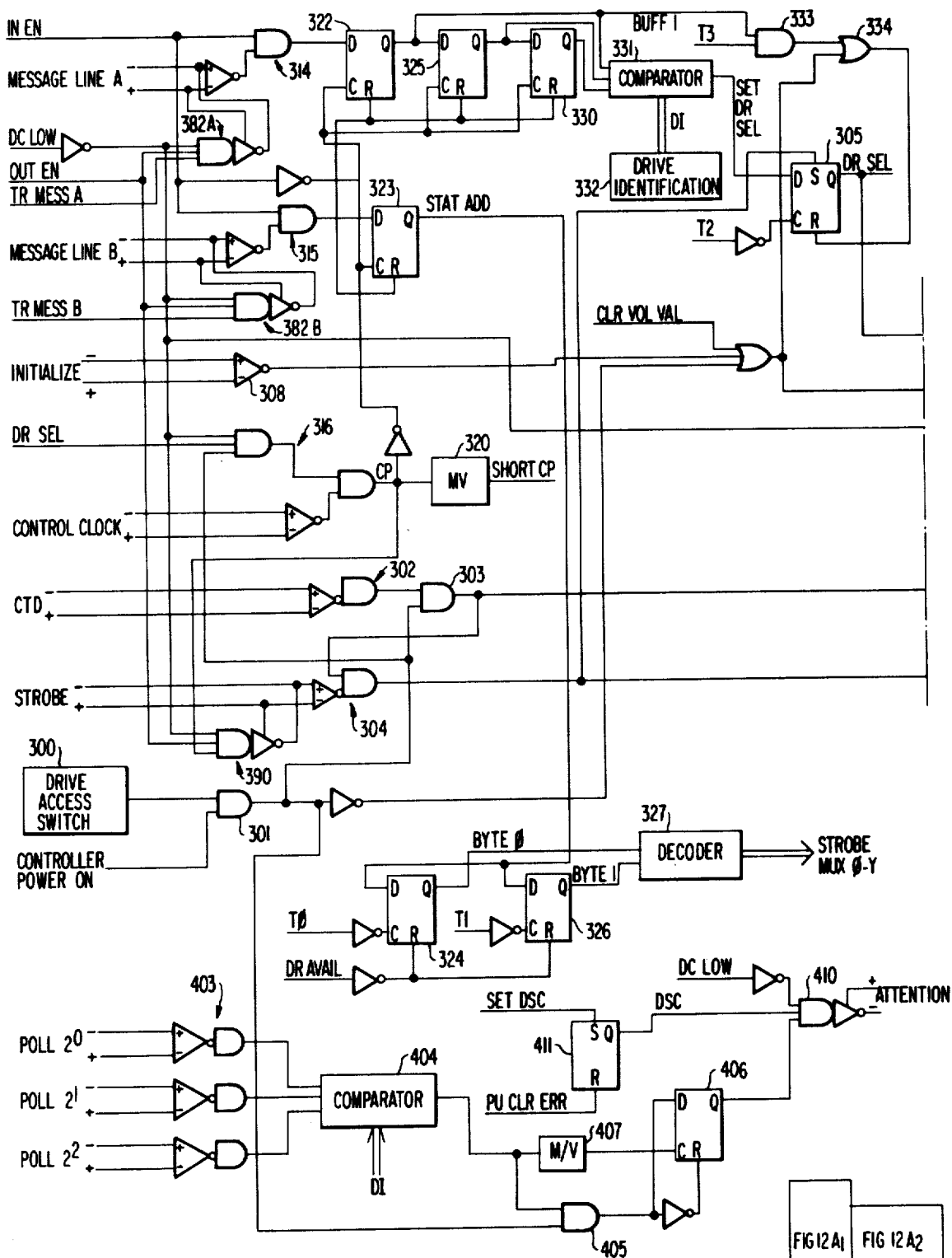
FIG 12A1

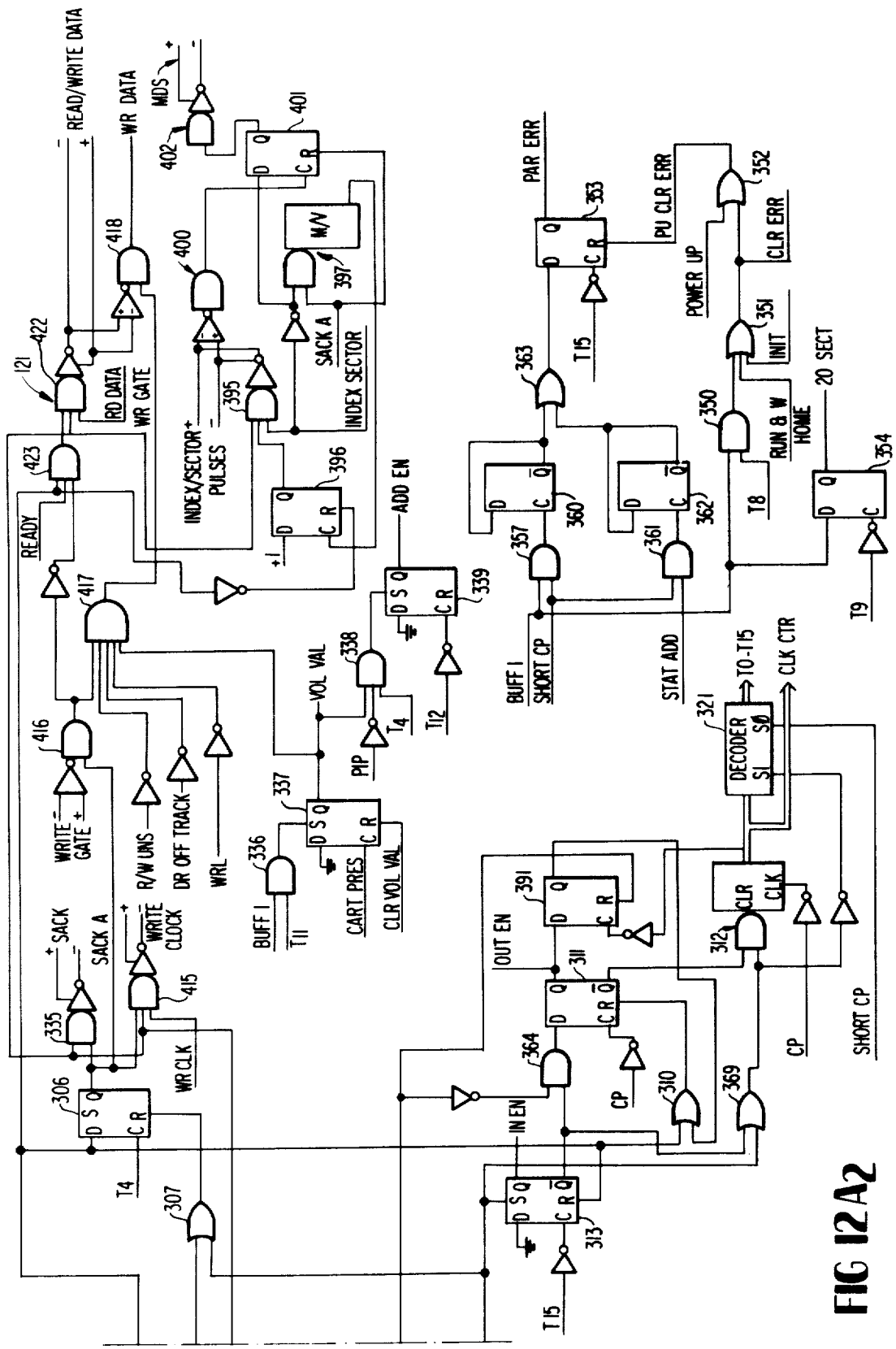
FIG 12A2

SECONDARY STORAGE FACILITY WITH MEANS FOR MONITORING ERROR CONDITIONS

BACKGROUND OF THE INVENTION

This invention generally relates to data processing systems and more specifically to secondary storage facilities utilized for storing data in such systems.

A secondary storage facility used in a data processing system generally comprises a controller and one or more drives connected to the controller. The drives include direct access memory devices, such as magnetic disk or drum memories, and newer magnetic bubble memories.

These secondary storage facilities, especially facilities using magnetic disk memory devices as the drives, have become very sophisticated in recent years. However, the circuitry that is required in such facilities has increased in complexity. For example, individual drives may include many registers for storing information that is necessary to enable the drives to perform control functions, such as a simultaneous positioning of reading and writing heads in different drives. Both control information (such as sector and track addresses) and data are transferred by producing related signals in parallel. This requires an increase in the amount of hardware associated with each drive since the information recorded on each drive is in serial form.

The cables that interconnect the magnetic drives and their associated controller also comprise large numbers of conductors. This further increases the hardware complexity because each conductor in such a cable requires at least a receiver and/or transmitter for each conductor terminations at both the controller and at each drive. These cables contain so many conductors that they become physically large and stiff. They are therefore unwieldy to handle. As a result, both the labor and hardware costs for installing cables can become a significant portion of the total costs of a secondary storage facility.

As such facilities become more complex, the changes of a malfunction occurring increase. Furthermore, the sheer number of circuits and the use of parallel signal transfers make the diagnosis of such malfunctions more difficult.

Therefore, it is an object of this invention to provide a secondary storage facility, and more specifically a drive for use in such a facility, that improves reliability by reducing circuit complexity.

Another object of this invention is to provide a drive and a secondary storage facility in which the complexity and costs of interconnecting the drive with its controller are reduced over prior facilities.

Still another object of this invention is to provide a drive and a secondary storage facility in which the diagnosis of malfunctions that occur within the facility is simplified.

Yet another object of this invention is to provide a drive and a secondary storage facility in which the overall cost of the drive and the facility are reduced by eliminating redundant hardware, especially in the drives.

SUMMARY OF THE INVENTION

In accordance with this invention, the foregoing objects are achieved primarily by utilizing serial, rather than parallel, signal transfers between the controller and drive, and also by using special signal handling techniques during such transfers. For example, in accordance with one aspect of this invention, both the control information that is ncessary to initiate a data transfer with a drive and the data that is transferred are coupled in serial form between the controller and the drive. When control information is sent to a drive from the controller, the drive returns status information back to the drive as a status message, also in serial fashion. In accordance with another aspect of this invention, all the drives connected to a controller initially respond to information from the controller that specifies one of the drives. However, only the identified drive continues to respond after the identification information is transmitted. Also, a drive will transmit an attention signal to indicate an error condition or the completion of a head positioning operation. In accordance with another aspect of this invention the controller constantly polls the attention signals produced by each bus. This polling operation is performed concurrently with other facility operations thereby to provide a simplified method of identifying any drive that is generating an attention signal without detracting from the overall characteristics of the secondary storage facility.

This invention is pointed out with particularity in the appended claims. The above and further objects and advantages of this invention may be better understood by referring to the following detailed description taken in conjunction with the accompanying drawings.

BRIEF DESCRIPTION OF THE DRAWINGS

FIG. 5 illustrates the information that can be transmitted during a transfer of messages between the controller and drive;

FIGS. 6A through 6E are detailed block diagrams of the controller shown in FIG. 2;

FIG. 7 depicts the details of certain registers that are utilized in the controller shown in FIGS. 6A through 6E;

FIGS. 8A1 and 8A2 through 8C are detailed logic diagrams of portions of the control circuitry shown in FIGS. 6A through 6E;

FIGS. 10A and 10B are timing diagrams useful in understanding the transfer of messages between a drive and a controller;

DESCRIPTION OF AN ILLUSTRATIVE EMBODIMENT

A. General Discussion

Figure 1:
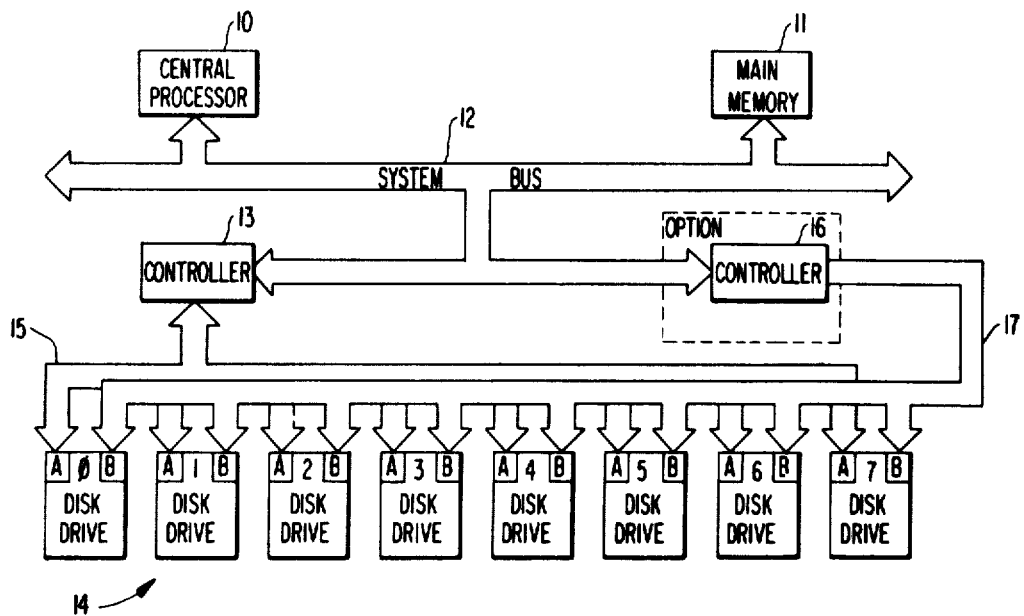
FIG. 1 is a block diagram of a typical data processing system utilizing a secondary storage facility constructed in accordance with this invention.

FIG. 1 discloses a typical data processing system configuration that includes a central processor unit 10 and a main memory unit 11 with an interconnecting system bus 12. Various peripheral units, such as input/output typewriters or other like devices, normally would connect to the system bus 12, although they are not shown. A secondary storage facility is also shown as a comprising controller 13, a number of disk drives 14 and an interconnecting drive bus 15 that connects the controller 13 and first ports in disk drives 14 in a daisy chain orientation. As shown in FIG. 1 this secondary storage facility includes an optional controller 16 and a second interconnecting drive bus 17 that connects to second ports in each of the disk drives 14. This specific configuration allows both controllers 13 and 16 to independently exercise supervision over the operation of the various disk drives. In such a configuration the disk drives contain control circuitry for arbitrating simultaneous requests from the individual controllers, such circuitry being known in the art. This specific configuration illustrates that a facility incorporating this invention can operate in either a conventional single controller-multiple drive configuration or a multiple controller-multiple drive configuration.

Figure 2:
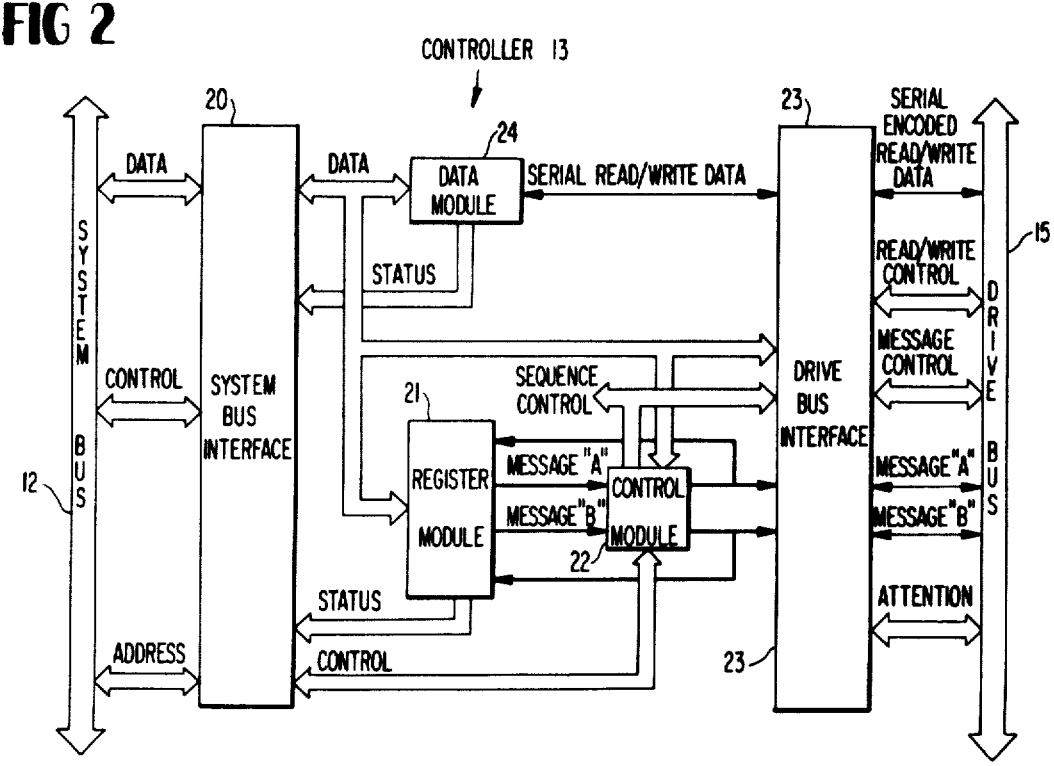
FIG. 2 is a basic block diagram of a controller that is useful in the secondary storage facility shown in FIG. 1.

Now referring to FIG 2, the controller 13 connects to the system bus 12 and the drive bus 15 through a number of connections. A system bus interface 20 receives data, control and address signals from corresponding conductors of the system bus 12 and also transmits corresponding signals onto the system bus 12. During normal operations, disk operating programs, performed from time to time by the central processor unit 10 (FIG. 1), initiate sequences of events to produce control functions or data transfer functions. Initially, control information is transferred through the system bus interface 20 into other circuitry in the disk drive, such as individual registers in a register module 21. For example, for a data transfer function this information will include an initial address for a storage location from which the data is to be received or to which it is to be sent and the amount of data (i.e., the number of words) to be transferred. As described more fully later, the register module 21 transmits, in serial form, two control messages through a control module 22 and drive bus interface 23 onto serial message lines, designated as MESSAGE "A" and MESSAGE "B" lines at the drive bus 15 at the same time module 21 transmits other signals for controlling the transfer of a message (i.e., the MESSAGE CONTROL signals). If a data transfer is involved in the function, drive bus interface 23 conveys SERIAL ENCODED READ/WRITE DATA signals and associated READ/WRITE CONTROL signals between the drive bus 15 and other modules in the controller 13 through a data module 24. An ATTENTION signal and other signals that are not shown in FIG. 2 are described later.

Figure 3:
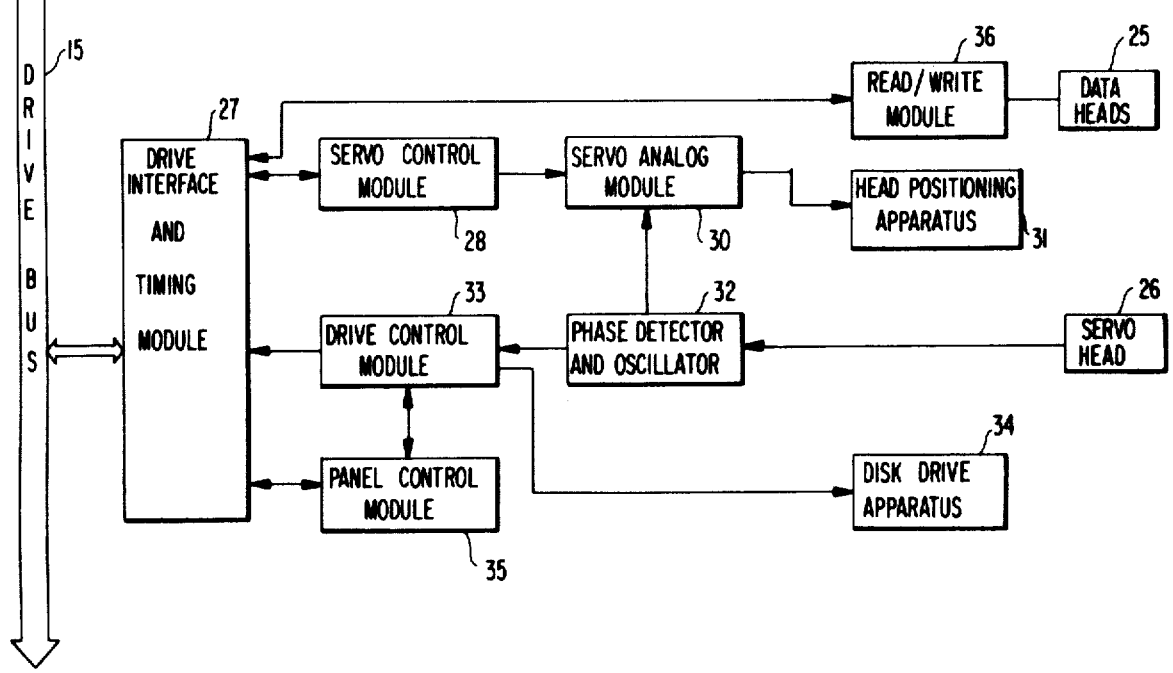
FIG. 3 is a block diagram of a disk drive that is useful in the secondary storage facility shown in FIG. 1.

A typical disk drive that connects to the drive bus 15 is shown in FIG. 3. In the following discussion it is assumed that the disk drive comprises movable heads that include plural read/write data heads 25 and a servo head 26. It also comprises a removable cartridge with plural disks, one surface of one disk containing permanently recorded servo information. In addition each surface is divided into cylinders, tracks and sectors. A drive interface and timing module 27 receives all the signals from the drive bus 15. A servo control module 28 and a servo analog module 30 respond to various signals from the drive interface and timing module 27 by energizing head positioning apparatus 31. In addition the servo analog module 30 receives timing information derived from signals transmitted by the servo head 26 and a phase control and oscillator module 32. The phase control and oscillator module 32 also enables a drive control module 33 to generate signals that are transmitted to the controller, to disk drive apparatus 34 and to a panel control module 35. The panel control module 35 includes such items as a RUN/STOP indicator switch, selection indicators and switches that also provide input signals for the drive interface and timing module 27. Finally there is a read/write module 36 that performs various functions on the data signals as they are conveyed between the drive bus 15 and the data heads 25.

In the spcific embodiment of a secondary storage facility as shown thus far, the data processing system transmits commands to the controller in FIG. 2 to effect different operations. Each such command identifies a particular disk drive. For purposes of this discussion these commands can be divided into Class A, Class B and Class C commands. The Class A commands include:

1. A SELECT DRIVE command that obtains drive status and error information from the selected drive; it also can be used to deselect a drive when the drive is connected to a pair of controllers;

2. A PACK ACKNOWLEDGE command that sets a volume valid flip-flop in the selected disk drive; the volume valid flip-flop remains set unless the cartridge is changed, power has been removed from the disk drive or some other related condition occurs;

3. A DRIVE CLEAR command that clears all error flags and the circuitry for generating the ATTENTION signal in the selected drive;

4. An UNLOAD command that retracts the heads and then stops a drive spindle in the disk drive apparatus 34 that produces disk rotation;

5. A START SPINDLE command that initiates a sequence for energizing the drive spindle in the selected drive;

6. A RECALIBRATE command that causes the selected drive to position its heads to the outermost cylinder position and then resets a current cylinder address register in that disk drive to a reference address (normally a 000 cylinder address);

7. An OFFSET command that positions the heads a specified distance from the center line of a track in the selected drive; and 8. A SEEK command that positions the heads over a specified cylinder in the selected drive.

The Class B commands include READ HEADER and WRITE HEADER commands. In response to the READ HEADER command, the controller initiates a seeking operation, as in response to a SEEK command. In addition, one of multiple read/write heads is selected. After the heads are positioned, the first three header words in the next sector are read and transferred into the data module 24, shown in FIG. 2, for subsequent examination. In response to the WRITE HEADER command a head also is selected and positioned. After receiving an index pulse (there is one index pulse generated for each revolution of the disk), the controller transfers zeros onto the disk until a sector pulse is detected. Then the system stores a header preamble field, a header field, a header check field and other fields in the sector. Data words in the sector are written as all zeros. This process is repeated for each successive sector until the index pulse is detected again.

The Class C commands initiate data transfers and include READ DATA, WRITE DATA and WRITE CHECK commands. In response to a READ command, an identified disk drive performs a seek operation and selects one of the read/write heads. Then the controller examines the sector addresses in the header information returned from the disk drive until a correspondence is found with the sector address sent to the controller. Data is then transferred from the disk cartridge through the data module 24 in FIG. 2 from consecutive sectors, tracks and cylinders until a specified number of data words has been transferred. Various error checking operations also occur.

The WRITE DATA command performs an analogous sequence of operations but transfers the data from the data module 24 onto the disk cartridge. In response to a WRITE CHECK command, data is read from a specified sector and compared in the data module 24 on a word-by-word basis with the data stored in the main memory to determine if any errors exist.

B. The Drive Bus 15

Figure 4:
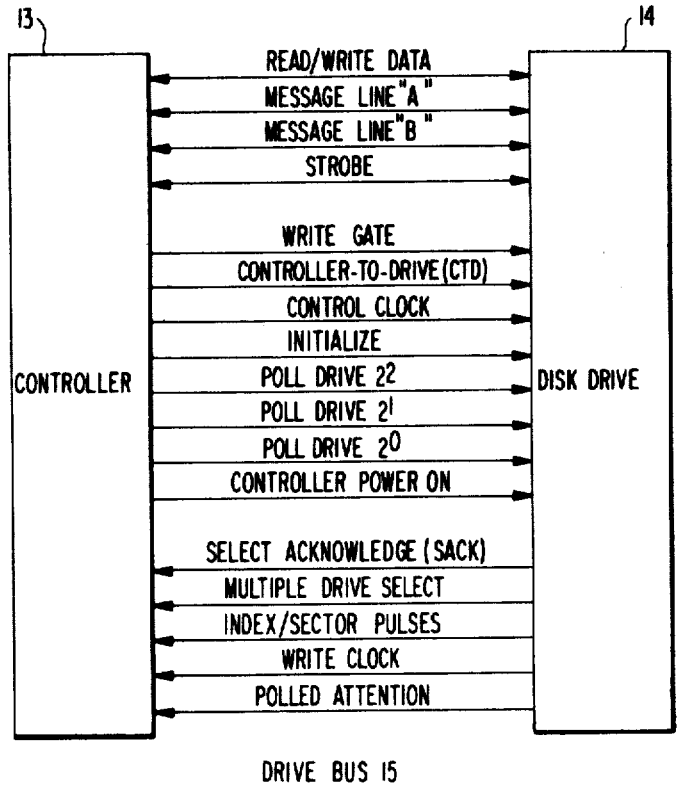
FIG. 4 is a diagram that depicts the various signals that are transmitted between the controller and drive over an interconnecting drive bus.

Referring now to FIG. 4, when Class A commands are received, information is transmitted over MESSAGE LINE "A" and MESSAGE LINE "B" together with message control signals on a STROBE line, a CONTROLLER-TO-DRIVE (CTD) line and a CONTROL CLOCK line. In addition, a SELECT ACKNOWLEDGE (SACK) line conveys a signal from the disk drive to the controller. When a Class B or C command is received, data is transmitted over a READ/WRITE DATA line and the transfers are synchronized, in part, by signals on an INDEX/SECTOR PULSES line. Signals on WRITE GATE and WRITE CLOCK line also are utilized for synchronizing during transfers to the disk drive.

Still referring to FIG. 4, we now will discuss the signals on the drive bus 15 in more detail. CONTROL CLOCK pulses are transmitted by the controller 13 so long as power is applied to the controller. This signal is normally derived from an oscillator in the drive bus interface 23, in FIG. 2, and it synchronizes drive operations. A typical waveform for the CONTROL CLOCK pulses is shown in Graphs A and G in FIG. 5. In that specific embodiment the CONTROL CLOCK pulses define two sequences of sixteen time intervals respectively identified as intervals T0 through T15.

A STROBE pulse can be generated by either the controller 13 or the disk drive 14. It initially is generated as a single pulse by the controller 13 and is used in conjunction with signals on MESSAGE LINE A and MESSAGE LINE B as shown in Graph B in FIG. 5. This enables the disk drives to begin receiving messages and it synchronizes the drive logic circuits with the controller transmissions. Then, the selected disk drive transmits messages back to the controller. During these transmissions the drive control module 33 (FIG. 3) couples the CONTROL CLOCK pulses onto the STROBE line as shown in Graph H.

The control module 22 asserts a CTD signal, as shown in Graph C, during the transmission of each message to the disk drive. Once the message is completed, the CTD signal shifts to a non-asserted level and thereby enables the receipt of a status message from the disk drive.

MESSAGE LINE A and MESSAGE LINE B are bidirectional serial message lines for sending control information to and receiving status information from the disk drives. Messages are transmitted simultaneously on both lines in the same direction, and each message has a fixed number of bits. In the specific embodiment described herein and as shown in FIG. 5, the messages contain fifteen information bits plus one parity bit.

Referring specifically to Graphs E and F in FIG. 5, the first information over MESSAGE LINE A is a drive selection code that identifies one of the disk drives connected to that controller. The first information transmitted over MESSAGE LINE B identifies which of a group of status messages is to be retrieved. Thereafter other signals are transmitted in response to the particular command then being processed. For example, if a Class C command has been received, a ONE signal at the SEEK COMM time initiates a seeking operation. If the signal on MESSAGE LINE A is asserted at the SEEK COMM time, a cylinder address is transferred over MESSAGE LINE B, whereas offset information is transferred if an OFFSET command is being implemented; the OFFSET command is implemented when the signals on MESSAGE LINE A are not asserted at the SEEK COMM and RECAL times and when the signals on MESSAGE LINE B are asserted at times T11 and T12.

Various items of status information are then returned over MESSAGE LINE A and MESSAGE LINE B when controller to disk drive transmission has been completed. Typical status messages are shown in Graphs K through N on MESSAGE LINE A and Graphs O through R on MESSAGE LINE B.

Looking at a specific example of a control message and a status message, the drive select code is sent during the first three time intervals is response to all commands. The DESEL/RELSE signal is sent in response to a SELECT DRIVE command. If a SEEK, READ HEADER, WRITE HEADER, READ, WRITE, or WRITE/CHECK command is being processed, the SEEK COMM signal is sent at the T4 time interval. In these cases a cylinder address is sent during the CYLINDER ADDRESS/OFFSETS time intervals for MESSAGE LINE B. The START SPINDLE signal is sent in response to a START SPINDLE command; the RTC signal, in response to a WRITE or WRITE-HEADER command; the DRIVE CLEAR signal, in response to a DRIVE CLEAR command. The 20 SECT FORMAT signal is asserted if the disk drive contains 20 sectors on each track; this signal is monitored during operations in response to SEEK, READ HEADER, WRITE HEADER, READ DATA, WRITE DATA and WRITE CHECK commands. The SET MED OFF LINE signal is sent in response to an UNLOAD command; the SET VOL VAL signal, in response to a PACK ACKNOWLEDGE command. The HEAD SELECT CODE signals convey information when the message is being sent in response to a SEEK, READ HEADER, WRITE HEADER, READ DATA, WRITE DATA or WRITE-CHECK command. Finally, a PARITY signal is sent in accordance with the status of the other signals.

Now referring to Graph F, the first signals identify the particular group of status messages which is desired. As previously indicated, the CYLINDER AD- DRESS/OFFSETS signals specify either the cylinder address or a head offset. The last signal is a PARITY signal for the message.

The first three signals in any status message that is returned on MESSAGE LINE A correspond to the drive selection code. In one specific embodiment parts of the message provide information as shown in Graphs K through R. For example, if the requested status message is message 00, the signals convey status information as depicted in Graphs K and O. At time T5 the DR AVAIL signal indicates that the selected drive is available; this signal is used when a drive is connected to two controllers. If the VOL VAL signal is asserted, the medium is properly installed in the disk drive. The DR READY signal is asserted when the disk drive is ready to accept a command. If the controller can connect to different types of drives, the DRIVE TYPE signal indicates which of the two types of drives is involved. The 20 SECT FORMAT signal specifies the particular sector format on the identified disk drive. The OFFSET ON signal is asserted in response to the receipt of an OFFSET command. A WR LOCK signal is asserted when the drive is protected against writing operations, normally by actuating a switch on a control panel. The SPINDLE ON signal is active when the drive motor for rotating the disk medium is energized. A PIP signal is asserted while the heads are being moved in response to a seek, recalibrate, offset or unloading operation. The DR STATUS CHANGE signal indicates whether any change in the status of a disk drive has occured. The DR STATUS CHANGE signal generates the POLLED ATTENTION signal in FIG. 4. The last signal is a PARITY signal based upon contents of the specific status message.

Simultaneously with the transmission of this AO status message shown in Graph K, the disk drive transmits status message BO shown in FIG. 5. A first group of information signals (two in this specific embodiment) identify the selected message. In this particular example they are 00. The INV ADDR signal indicates whether the drive has received an invalid head or cylinder address. The AC LOW signal is asserted when the line voltage at the disk drive drops below a predetermined value. The FAULT signal is asserted in response to any drive error condition. The NXF signal is asserted in response to the receipt of a SEEK command or the assertion of a WRITE GATE signal on the drive bus 15 while the VOL VAL signal is cleared. The C-D PRTY ERR signal indicates whether a parity error has occurred during the transmission from the controller to the drive.

Whenever a drive fails to successfully complete a seeking operation to a new cylinder, it generates a SEEK INC signal. It produces a WR LOCK signal whenever the WRITE GATE and WRITE LOCK signals appear simultaneously. If the spindle speed falls below a predetermined value and the heads have been unloaded but no unsafe condition exists, a SPEED LOSS signal is transmitted. If the heads are at an unsafe distance from the track center line and the WRITE GATE signal is asserted or if the disk drive is not ready and the WRITE GATE signal is asserted, the DR OFF TRACK signal is generated. If any unsafe condition exists, the RD/WR UNSAFE signal is asserted. The last signal is a parity signal that is based upon this status message.

The interpretation of the signals in the remaining messages is not described in detail. It will be apparent, however, from the following discussion that any desired status information can be conveyed to the controller by means of these status messages.

Another control signal that appears on the bus 15 is the SELECT ACKNOWLEDGE (SACK) signal. It is transmitted by a disk drive when it recognizes a particular drive selection code transmitted over MESSAGE LINE A. When the SACK signal is asserted, it enables a selected disk drive to convey index and sector pulses to the controller 13 over the INDEX/SECTOR PULSES line. These pulses will continue to be transmitted until the disk drive is "deselected" (i.e. effectively disconnected) from the controller 13.

The READ/WRITE DATA line in the drive bus 15 carries data that is transmitted to the disk drive 14 during a writing operation and retrieved from the disk drive 14 during a reading operation. The controller 13 also transmits a WRITE GATE signal during the execution of a WRITE HEADER or WRITE DATA command thereby to enable the generation of writing currents in the selected drive. Also during a writing operation, the disk drive utilizes information recorded on a servo surface of the disk to generate WRITE CLOCK pulses. These pulses are utilized in a phase locked oscillator in the controller 13 to synchronize the WRITE DATA signals with the disk. This enables constant density recording regardless of minor velocity fluctuations.

There are also some other control signals that are transmitted over the drive bus 15. A MULTIPLE DRIVE SELECT signal is asserted whenever more than one drive simultaneously responds to a given drive selection code transmitted over MESSAGE LINE A. The POLL DRIVE $2^0$ through POLL DRIVE $2^2$ signals are binary coded signals that enable the controller to continuously scan all the disk drives connected to it independently of the normal drive operations thereby to monitor the ATTENTION signal in each disk drive. If a disk asserts its ATTENTION signal, it will transmit a POLLED ATTENTION signal back to the controller when the POLL DRIVE signals identify the disk drive.

The CONTROLLER POWER ON signal indicates that the controller is energized and that a physical cable connection exists between the controller and the drives. If this conductor does not carry a signal, all the drives are deselected and the circuitry that responds to the STROBE signal is disabled in the controller.

An INITIALIZE signal deselects all disk drives, clears all drive error conditions, any ATTENTION signals and the circuitry that generates the DR STATUS CHANGE signal generated as part of a 00 MESSAGE on MESSAGE LINE A.

C. Detailed Description

1. Preliminary Operations

For a better understanding of this invention, it will be helpful to consider a specific embodiment that is adapted for operation with a PDP11 data processing system manufactured by Digital Equipment Corp. of Maynard, Mass., the assignee of this invention. To initiate any type of operation with a secondary storage facility, the data processing system utilizes a sequence of writing operations over the system bus 12 (FIG. 1) to load control information into the various registers in the controller 13. A memory address identifies each such register.

Referring to FIG. 6A, the system bus interface 20 receives data signals on BUS D conductors, memory address signals on BUS A conductors and direction control signals indicating a writing operation on BUS C0 and C1 conductors. The data signals are received in data transceivers 50; the address and direction control signals, in address transceivers 51. After a short delay the system bus interface 20 receives a BUS MSYN signal in bus master logic 52. The bus master logic 52 couples this signal to a device select circuit 53 that compares the high-order address signals with address signals from a device selection switch circuit 54. If a comparison exists, the device select circuit 53 generates a SLAVE signal that enables a bus slave control circuit 55 to generate an SSYN OUT signal. The SSYN OUT signal from the bus slave control circuit 55 is transmitted through the bus master logic 52 to produce a BUS SSYN signal that is a slave synchronizing signal transmitted over the system bus 12. It enables a master device also connected to the same bus to complete the transfer cycle.

Simultaneously, the bus slave control circuit 55 enables a register decoder 56 to utilize the writing signal on the C1 IN conductor from address transceivers 51 and the low-order address bits to identify a particular register and generate a corresponding LOAD REG pulse. One such pulse from the register decoder 56 is a LOAD CS2 pulse which loads data into a control and status register 62 that also is shown in FIG. 6C. During this particular operation, a DO6 bit, which is set for a drive/clear operation, is loaded into initialize logic 57 in FIG. 6A. The logic 57 produces a CONTR CLR signal that clears various stages in the controller if the DO6 bit is a ONE.

Likewise, if a data reading or data writing operation is to be performed, it will be necessary to load a bus address into the controller. In response to a writing operation that identifies a bus address register 60, the register decoder 56 transmits a LOAD BA signal that enables the bus address register 60 to store the signals from the data transceivers 50.

Different commands require different preliminary operations. Each command, however, requires certain common information to be transferred to various registers distributed throughout the controller. For example, all commands require the identification of a disk drive. Singals identifying the disk drive to be involved in the ensuing operation are stored in the control and status register 62 shown in FIG. 6C. Message identification bits are loaded into a message selected register 61, shown in FIG. 6B, which comprises a portion of a first maintenance register (MR1) shown in FIG. 6E. These bits normally specify the return of status message 00; other status messages can be designated by in response to a SELECT command.

In preparation for a WRITE HEADER command, it also is necessary to load the address of the first word to be written into the bus address register 60 and the number of words to be written in a word count register 63 shown in FIG. 6C. All Class B commands require control information for the second control and status register 62 in FIG. 6C and address information for a desired cylinder register 64 in FIG. 6D and a disk address register 65 in FIG. 6C.

Class C commands require information that is analogous to the information that is transferred during a WRITE HEADER operation.

The information that is loaded in each of the particular controller registers is shown in FIG. 7 where different bit positions in each register identify different items of information. We do not show here such registers as the word count register 63 and the bus address register 60 that are devoted entirely to the work count or bus address respectively.

As shown specifically in FIG. 7, the four low-order bit positions (MSO0-MSO3 in the maintenance register 61 identify a number of messages while DS0 through DS2 bit positions in the control and status register 62 identify the disk drive. The desired cylinder register 64 contains ten bit positions that store a cylinder address. In the disk address register 65, the five least significant bits identify one of 32 sectors while three TA bits identify one of 8 tracks.

The last transfer involved in the issuance of any command loads the command and status register 66 shown in FIGS. 6A and 7. Referring to the detailed view of this register in FIG. 7, the CERR/CCLR bit is set to perform a clearing operation. Bit positions 14 and 13 are read-only bits that are used when the contents of the control and status register 66 are retrieved. The CFMT bit identifies the type of sector format; the CDT bit, the type of drive. The BA17 and BA16 bits are extended bus address bits. If interruptions of the data processing system are allowed, an IE bit is set. Bits F4 through F1 define one of 16 commands. The GO bit is set to enable that command to be performed.

2. Controller Operation

In FIG. 6A, circuitry in the control and status register 66 transmits a CONTR READY signal while the disk drive is idle. Now referring to FIG. 8A, the CONTR READY signal, when asserted, presets a flip-flop 72 and clears a flip-flop 73. As a result, an AND gate 74 is not energized so a phase 1 timing circuit 75 is disabled. Simultaneously, the CONTR READY signal clears the timing circuit 75 to a 00 state. This signal also clears phase 2 timing circuit 76 and energizes an OR gate 77 thereby to preset an MSG flip-flop 78.

Figure 9A:
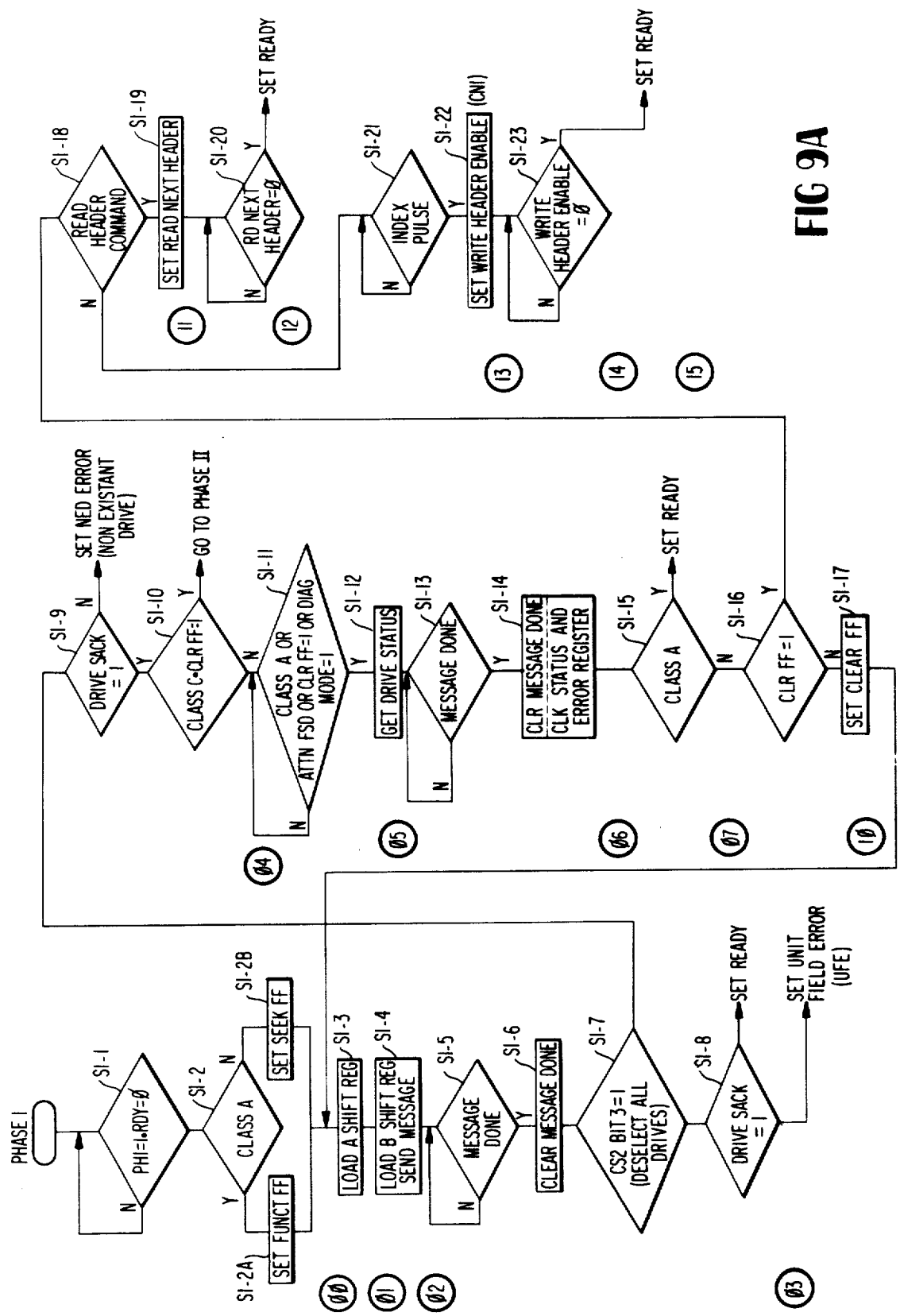
FIGS. 9A and 9B are flow charts that set forth the timing of the circuitry shown in FIGS. 6A through 6E.

When the register decoder 56 in FIG. 6A transmits the LOAD CS1 pulse, the leading edge of that pulse loads the data from the data tranceivers 50 into the control and status register 66. Circuitry associated with the control and status register 66 then generates a clearing signal to initialize control logic throughout the controller 13. On the traling edge of the LOAD CS1 pulse, the control and status register 66 asserts the GO signal and terminates the CONTR READY signal. When the CONTR READY signal terminates, it removes the presetting signal from the MSG flip-flop 78, but the MSG signal remains asserted. Although the clearing input to the phase 2 timing circuit 76 is removed, the PH1 signal from the flip-flop 72 continues to disable that circuit. Finally, the clearing input to the phase 1 timing circuit 75 is removed. The next CCLK signal sets the flip-flop 73 thereby energizing the AND gate 74 and enabling the phase 1 timing circuit 75. This is step S1-1 in FIG. 9A. Notwithstanding the loss of the presetting input to the flip-flop 72, it remains in a set condition.

The phase 1 timing circuit 75 essentially comprises a sequence logic circuit that is advanced in response to CLK pulses. Upon the receipt of the first CCLK pulse, a number of operations occur. In step S1-2 the logic shown in FIGS. 8A sets either an FUN flip-flop 80 or a SEEK flip-flop 81. More specifically, if the received command is a Class A command, an F4 signal will be at a non-asserted level so the flip-flop 09 is set when the timing circuit 75 generates a SET FUN FF signal. For a Class B or Class C command the F4 signal is asserted, so the SEEK flip-flop 81 is set.

The next CCLK pulse defines step S1-3 and causes the phase 1 timing circuit 75 to generate a P1 LD A pulse. This pulse energized an OR gate 84 to generate a CLR HDR CNT pulse and loads information through a multiplexer 85, shown in FIG. 8B into an A shift register 86. More specifically, inverters 87A and 88A condition the A shift register 86 to receive data in parallel in response to each CCLK pulse. With the MSG flip-flop 78 in FIG. 8A set, the Pl LD A signal energizes an AND GATE 90 IN FIG. 8B and an OR gate 91 thereby to load the function and track address signals from the multiplexer 85 into the A shift register 86. The CLR HDR CNT signal from the OR gate 84 simultaneously energizes an OR gate 92 thereby to simultaneously load the DR SEL signals into the A shift register 86 from the control and status register 62 (FIG. 6C).

SR CLK pulses from the OR gate 91 also clock MSG SEL signals into the corresponding bit positions in a B shift register 93, which inverters 87B and 88B conditioned for parallel loading.

Figure 8A:
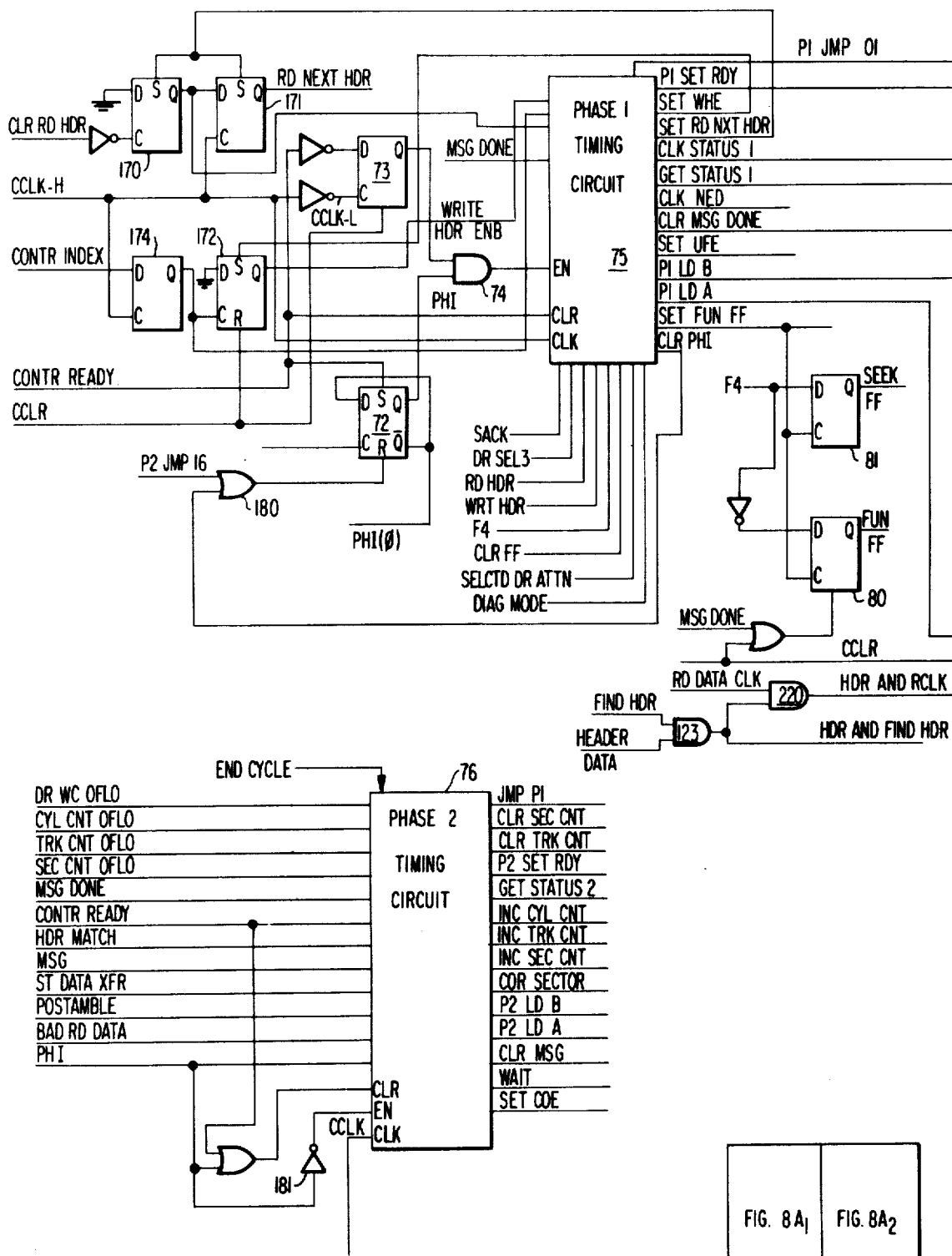
FIGS. 8A including

In step S1-4, the phase 1 timing circuit 75 transmits a P1 LD B signal which performs two functions. First, it energizes a one-shot monostable multi-vibrator 94 in FIG. 8A. The resulting LD B PUL signal passes through an OR gate 95 in FIG. 8B to load information from multiplexers 96 and 97 into the remaining stages in the B shift register 93. If the MSG flip-flop 78 in FIG. 8A is set, the B shift resigter 83 receives the CYLINDER/OFFSET bits. The P1 LD B signal also clocks a flip-flop 98 in FIG. 8A to a set condition because the MSG signal is asserted. The next CCLK pulse then clocks a flip-flop 100 and generates a STROBE OUT signal. This signal is routed to transceivers 101 in FIG. 8B that transmit the STROBE signal onto the STROBE line of the drive bus 15 and initiate a message transfer. At the same time another transmitter 112 shifts the CTD signal on the CTD line to an asserted level because a flip-flop 103 in FIG. 8A is cleared. The foregoing operation is shown in Graphs A through E in FIG. 10A. When the flip-flop 100 sets, an AND gate 104 transfers the next asserted CCLK pulse through an OR gate 105 to clear the flip-flop 98 and enable the flip-flop 100 to be reset by the next CCLK pulse thereby terminating the STROBE OUT signal as shown in Graph E of FIG. 10A.

Figure 8B:
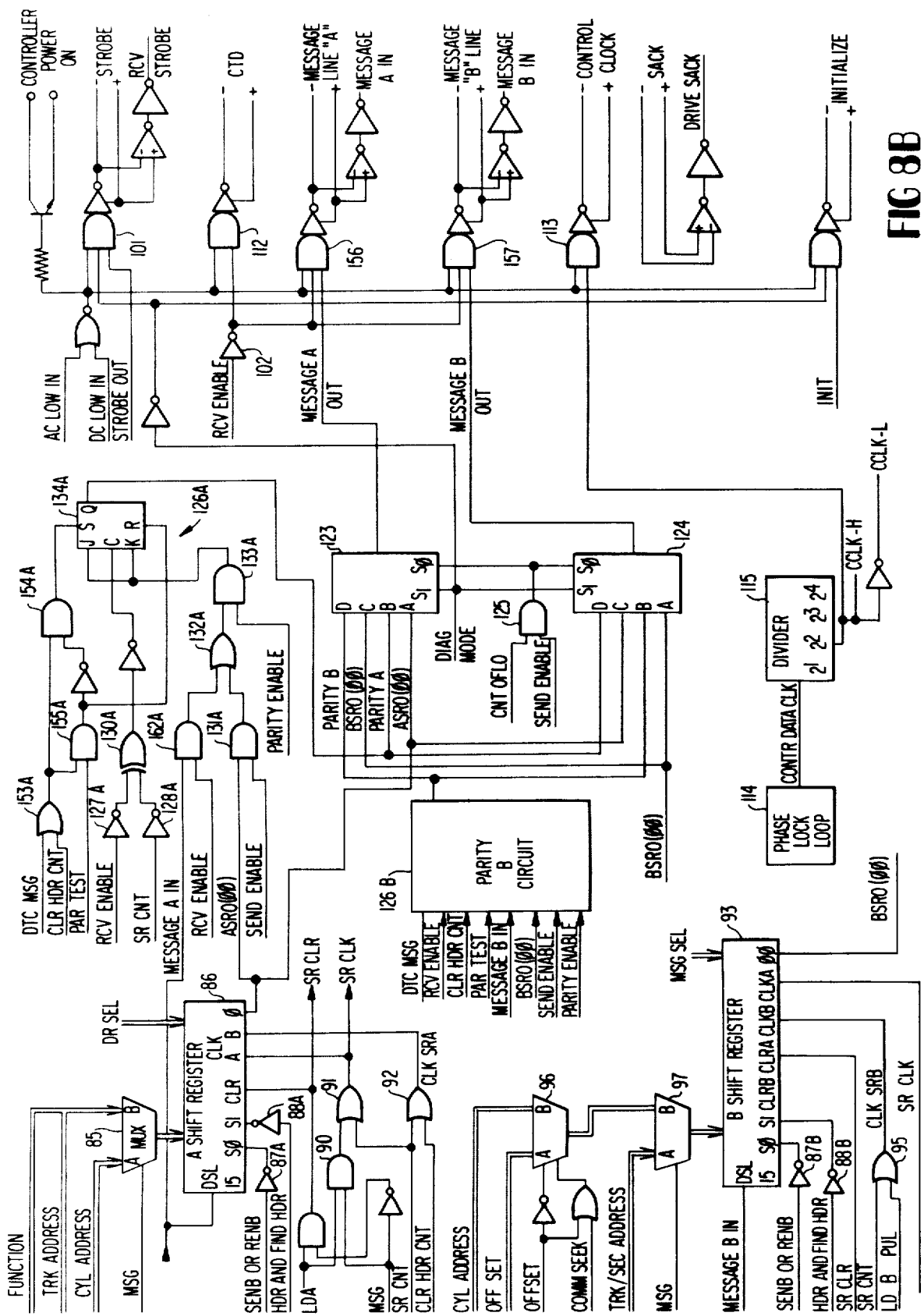

Referring to the transceiver 101 in FIG. 8B, it will be noted that the STROBE line actually includes two wires that are driven by positive and negative outputs from operational amplifiers thereby to transmit differential signals. All the "lines ", except the CONTROLLER POWER ON line, comprise such conductor pairs.

Figure 10A:
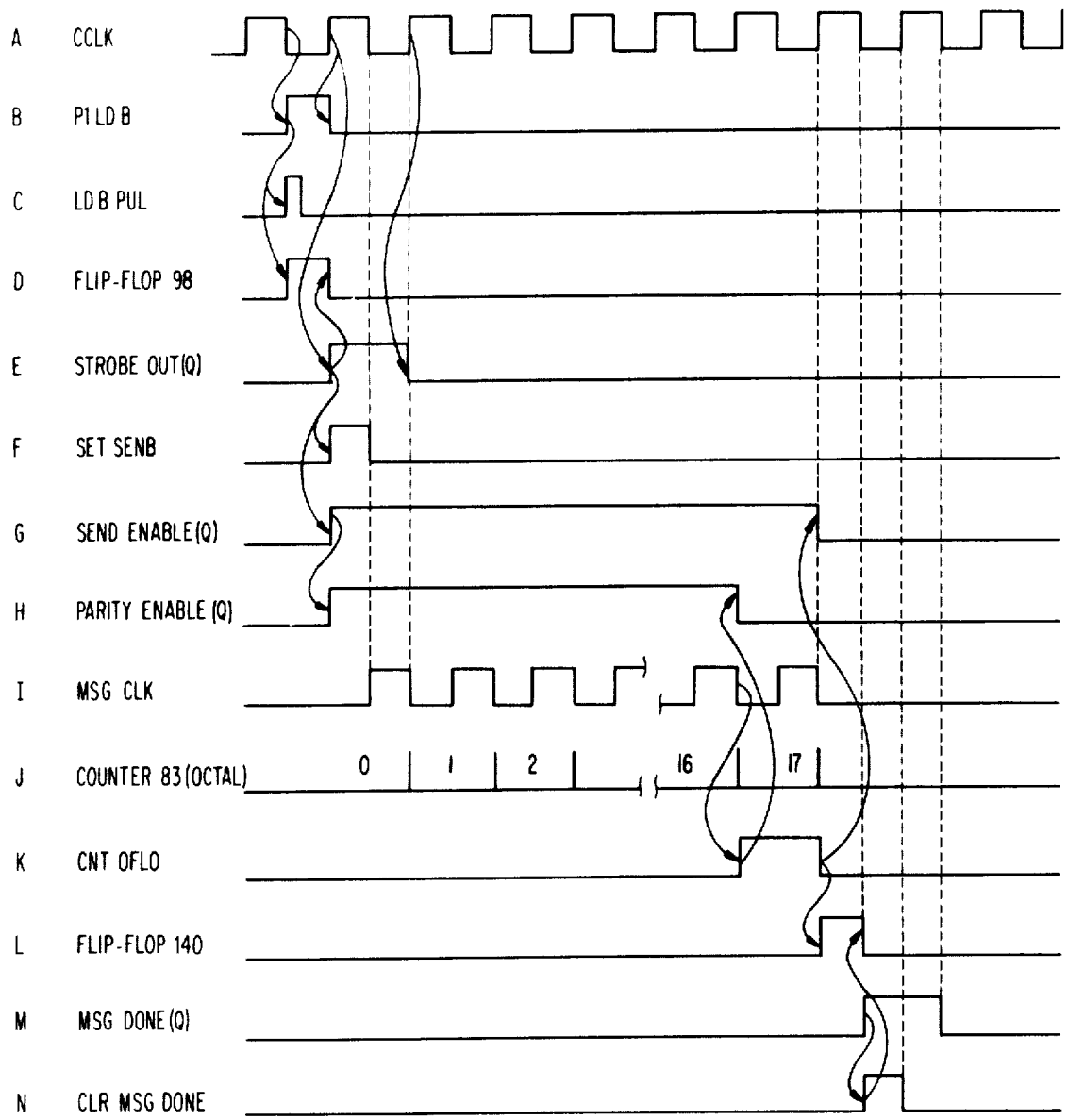

On the leading edge of the STROBE OUT pulse, the AND gate 104 simultaneously presets a flip-flop 106 that generates a SEND ENABLE signal as shown in Graph G of FIG. 10A. This signal presets a flip-flop 107 that generates a PARITY ENABLE signal (Graph H). The SEND ENABLE signal also enables an AND gate 110 to energize an OR gate 111 with inverted CCLK pulses to produce MSG CLK pulses (Graph I). The MSG CLK pulses are out of phase with the CONTROL CLOCK pulses from a transmitter 113 in FIG. 8B. This transmitter is energized in response to signals from a phase lock loop 114 that generates CONTR DATA CLK pulses and a divider 115 that produces the CCLK pulses.

Each MSG CLK pulse controls the transmission of a message to the drive. First, each pulse energizes a NOR gate 120 to transmit an SR CNT pulse that advances the counter 83 on the trailing edge of the MSG lines"In addition, the leading edge of each SR CNT pulse passes through a network comprising OR gates 91, 92 and 95 in FIG. 8B thereby to clock the A and B shift registers 86 and 93. With the flip-flop 106 set, the SEND ENABLE signal energizes an OR gate 122 so an SENB OR RENB signal is active. However, the FIND HDR and HEADER DATA signals are not active, so an AND gate 123 in FIG. 8A can not transmit the HDR AND FIND HDR signal. Under this state inverters 87A, 88A, 87B and 88B condition the registers 86 and 93 to shift data to the right through their respective 00 bit positions as a sequence of ASRO(00) and BSRO(00) signals respectively.

During this sequence, signals stored in the shift registers 86 and 93 are transmitted onto MESSAGE LINE A and MESSAGE LINE B through multiplexers 123 and 124, respectively, that are controlled by various signals applied directly to those multiplexers and an AND gate 125 as shown in FIG. 8B. During normal operations, a DIAG MODE signal is not asserted. As the counter 83 in FIG. 8A does not produce an overflow signal at a CO output during the first fifteen time intervals, the AND gate 125 is disabled. As a result, the outputs of the multiplexers 123 and 124 are connected to the A inputs respectively that receive the ASRO(00) and BSRO(00) signals. As each ASRO(00) and BSRO(00) signal is shifted onto the MESSAGE LINE A and MESSAGE LINE B, they are applied to a parity A circuit 126A and a parity B circuit 126B respectively. Only the parity A circuit is discussed in detail with the elements designated by the suffix "A".

Within the parity A circuit 126A, a RCV ENABLE signal from the flip-flop 103 is not asserted, so SR CNT pulses pass through an inverter 128A and an exclusive OR circuit 130A without inversion and are then inverted to produce out-of-phase clocking pulses. Since the flip-flop 106 is set, the SEND ENABLE signal is active, so the ASRO(00) signals are applied to an AND gate 131A and an OR gate 132A thereby to be applied through an AND gate 133A, enabled by the PARITY ENABLE signal from the flip-flop 107 in FIG. 8A, to a JK flip-flop 134A. The flip-flop 134A is thereby conditioned to respond to the ONES and ZEROS that are shifted onto the MESSAGE LINE A.

When the counter 83 in FIG. 8A reaches the last count identified as count 17 (octal) in Graph J in FIG. 10A, it produces the CNT OFLO signal (Graph K). When this occurs, the AND gate 125 in FIG. 8B is energized and it conditions the multiplexers 123 and 124 to connect their outputs respectively to the B inputs so the next MSG CLK pulse passes the parity signal onto the message lines.

The CNT OFLO signal also energizes an OR gate 137 in FIG. 8A thereby to transmit an END MSG signal that directly resets the PARITY ENABLE flip-flop 107. The leading edge of the next CCLK pulse advances the counter 83 and terminates the CNT OFLO signal. The trailing edge of the CNT OFLO signal clocks the flip-flop 106 to a cleared condition and terminates the SEND ENABLE signal. A flip-flop 140 also is set on the termination of the CNT OFLO signal (Graph L) because the flip-flop 78 that transmits the MSG signal is also set. The trailing edge of the next CCLK pulse then sets a MSG DONE flip-flop 141

(Graph M). This enables the next CCLK pulse to advance the phase 1 timing circuit 75 and transmit the CLR MSG DONE signal (Graph N).

Assuming that the system is not operating in a diagnostic mode, an AND gate 142 then energizes an OR gate 143 and clears the flip-flop 140 so that the trailing edge of the next CCLK pulse clears the MSG DONE flip-flop 141. These functions are represented as steps S1-5 and S1-6 in FIG. 9A. At this point messages have been sent to the drive.

Next the phase 1 timing circuit 75 tests the DR SEL 03 signal which corresponds to bit 03 in the second control and status register. If that bit contains 1, the identified drive is to be deselected so no status message will be returned. Therefore, the phase 1 timing circuit 75 is deenergized. More specifically, the phase 1 timing circuit 75 tests the SACK signal in step S1-8. If it is asserted, the phase 1 timing circuit 75 sets a UFE flip-flop in the control and status register 62 (FIG. 6C). The UFE signal from that stage is conveyed through a multiplexer 144 that transfers data under the appropriate conditions to the data transceivers 50.

If the SACK signal is not asserted, a drive has been identified and deselected so the system transmits a P1 SET RDY signal. This signal energizes OR gates 146 and 147. The OR gate 146 generates an OP DONE signal that enables the circuitry in the control and status register 66 to terminate the GO signal and assert the CONTR READY signal thereby to complete the operation. The OR gate 147 also applies a clearing signal to a CLR flip-flop 150.

Normally, however, the third bit position in the command does not contain a 1, so step S1-7 diverts to step S1-9 and tests the SACK signal. If the SACK signal is not asserted by this time, then no drive has been selected. The phase 1 timing circuit 75 therefore transmits a CLK NED signal that sets a non-existent drive flip-flop in the control and status register 62.

Assuming that the normal operation continues, step S1-9 branches to step S1-10 whereupon the nature of the command is ascertained. If a CLASS C command were being executed and the CLR flip flop 150 were set, then step S1-10 would shift control to the phase 2 timing circuit 76. At this time, however, the CLR flip-flop 150 is reset, so step S1-10 branches to step S1-11. If the command being executed is a class A command, then step S1-11 immediately branches to step S1-12 which enables the phase 1 timing circuit to transmit a GET STATUS 1 signal (Graph B in FIG. 10B). On the other hand, if the command is a class B or C command, then some positioning of the heads is necessary. The drive, upon completion of that positioning, transmits its ATTENTION signal. When that signal is sensed, a SELCDT DR ATTN signal will be asserted and will enable the phase 1 timing circuit to then transmit the GET STATUS 1 signal.

On the leading edge of the GET STATUS 1 signal, an OR gate 151 in FIG. 8A sets a flip-flop 152 thereby to generate a DTC MSG signal (Graph C in FIG. 10B). This signal energizes an OR gate 153A in the parity A circuit 126A shown in FIG. 8B and an analogous circuitry in the parity B circuit 126B. As a result, the OR gate 153A and an AND gate 154A directly set the flip-flop 134A, assuming an AND gate 155A is not energized by a PAR TEST signal that is generated only during a diagnostic mode. This conditions the PARITY A and PARITY B circuits 126A and 126B to receive an incoming message.

The next CCLK pulse energizes an AND gate 156 in FIG. 8A that is enabled by the flip-flop 152 and that directly sets the flip-flop 103 to generate the RCV ENABLE signal (Graph D). This signal is applied through the inverter 102 in FIG. 8B thereby to terminate the CTD signal from the transmitter 112 and also to disable the MESSAGE LINE A and MESSAGE LINE B transmitters 156 and 157 in FIG. 8B.

Once the flip-flop 103 has been set, the phase 1 timing circuit is disabled until the MSG DONE flip-flop 141 sets. Then the phase 1 timing circuit 75 produces a CLK STATUS 1 signal. More specifically, the termination of the GET STATUS 1 signal de-energizes the OR gate 151. Moreover, the RCV ENABLE signal enables an AND gate 161 to thereafter couple RCV STROBE signals, derived from the STROBE line on the drive bus 15 by means of the transceiver 101 (FIG. 8B), through the OR gate 111 in FIG. 8A as MSG CLK pulses (GRAPHS F and G). The next MSG CLK pulse clears the DTC MSG flip-flop 152 (Graph C). This sets the flip-flop 107 thereby to enable the PARITY ENABLE signal (Graph E).

As previously indicated, the MSG CLK pulses also energize the OR gate 120 to produce the SR CNT pulses. MESSAGE A IN signals are then coupled into the bit 15 position in the A and B shift registers 86 and 93 in sequence. In addition the RCV ENABLE signal enables the message bits to pass through an OR gate 162A (FIG. 8B) into the PARITY A circuit 126A and also into the PARITY B circuit 126B.

The timing sequence that occurs in the circuitry shown in FIGS. 8A and 8B for receipt of a message is essentially the same as that for transmission of a message to the drive. When the counter 83 overflows (Graph I), the status message has been received, so step S1-13 in FIG. 9A exits to step S1-14. More specifically, the leading edge of the CNT OFLO signal clears the flip-flop 103 through the OR gate 137. The trailing edge of the CNT OFLO signal enables the flip-flops 140 and 141 to be set and cleared thereby generating the MSG DONE signal (Graphs J and K) and enabling the phase 1 timing circuit 75 to generate the CLK STATUS 1 pulse. After the CNT OFLO signal terminates, the OR gate 137 resets the flip-flop 103 and terminates the RCV ENABLE signal.

The leading edge of the CLK STATUS 1 signal energizes an AND gate 165 enabled because the facility is not operating in a diagnostic mode. An OR gate 166 transmits a MSG RCVD signal that loads specific bits from the A and B shift registers 86 and 93 in parallel into appropriate registers. In this specific example MSG 00 is being received, so an AND gate 167 generates a LD STATUS signal that loads the information into the DRIVE STATUS and DRIVE ERROR registers 166 and 167 shown in FIG. 6C and 7. The phase 1 timing circuit 75 also generates a CLR MSG DONE pulse that is coextensive with the GET STATUS 1 pulse. This CLR MSG DONE pulse is routed to and clears the flip-flop 142 so that the MSG DONE flip-flop 141 is conditioned to be cleared on the trailing edge of the next CCLK pulse.

If the command that has been sent to the drive is a class A command, the phase 1 timing circuit 75 generates the P1 SET RDY signal. This signal energizes the OR gate 146 to generate the OP DONE signal that completes the operation and to apply an overriding clearing signal to the CLR flip-flop 150.

On the other hand, if a class B or C command is involved, step S1-15 branches to step S1-16. The flip-flop 150 is cleared, so in step S1-17 a P1 JMP 01 signal is generated that sets the CLR flip-flop 150. Then the controller operation returns to step S1-3 to transmit another set of messages to the drive and to receive those messages back from the drive.

When the phase 1 timing circuit again reaches step S1-10 the CLR flip-flop 150 will be set. If a class C command is being processed, control of subsequent operations shifts to the phase 2 timing circuit 76. If a class B command is being processed, step S1-16 branches to step S1-18 where the specific class B command is determined. If the command is a READ HEADER command, the phase 1 timing circuit 75 transmits a SET RD NXT HDR signal that presets flip-flops 170 and 171 (step S1-19) and enables the controller to read the next header in step S1-20. When the next header is received, circuitry in the data module 24 shown in FIG. 6B generates a CLR RD HDR signal. The trailing edge of that signal clears the flip-flop 170 so the next CCLK pulse terminates the RD next HDR signal and enables the phase 1 timing circuit 75 to transmit the P1 SET RDY signal.

On the other hand, if a WRITE HEADER command is received, step S1-18 branches to step S1-21. The phase 1 timing circuit 75 generates the SET WHE signal that presets a WRITE HDR ENB flip-flop 172. When the drive interface 23 shown in FIG. 6E receives a pulse from the INDEX/SECTOR PULSES line, a sector/index separator circuit 173 generates a CONTR INDEX signal that enables a next CCLK pulse to set a flip-flop 174 in FIG. 8A and thereby clears the flip-flop 172. It also enables the HEADER to be written in step S1-22. When the WRITE HDR ENB signal is then cleared by clearing the flip-flop 172, the phase 1 timing circuits 75 again generates the P1 SET RDY signal and terminates this timing sequence.

Whenever the timing circuit 75 generates a P1 SET RDY signal, the OR gate 146 in FIG. 8A generates the OP DONE signal. Again, this signal is returned to the circuitry associated with the control and status register 66 in FIG. 6A. It clears the stage generating the GO signal and enables the register 66 to again transmit the CONTR READY signal thereby reinitializing the phase 1 timing circuit 75 and related circuitry.

As previously indicated, the phase 1 timing circuit 75 generates a CLR PH1 signal on its second cycle when a Class C command is being processed. This signal energizes an OR gate 180 in FIG. 8A that clears the flip-flop 72. As a result, an inverter 181 enables the phase 2 timing circuit 76 to begin operations. This condition is designated as step S2-1 in FIG. 9B.

Assume that a WRITE command for transferring 256 words into the last sector of a last track on an intermediate cylinder in a disk drive has been received. Step S2-2 must branch to step S2-3 because a sector search will not yet have been initiated and because a BAD READ DATA signal cannot be asserted in response to a WRITING command. Likewise, step S2-3 must branch to step S2-4 because no data has yet been transmitted. Moreover, assuming that the identified cylinder is an intermediate cylinder, step S2-4 must branch to step S2-5 to determine when to start a data transfer.

Referring now to FIG. 6B, data to be written in the disk drive is transferred as a succession of words through an input buffer 200 into a silo memory 201. When the silo memory 201 has been filled as in this example, or when all the words have been transferred to the silo memory 201, as when only a few words are to be involved in a transfer, a fill silo counter 202 generates the ST DATA XFR signal to enable the phase 2 timing circuit 76 to clear the MSG flip-flop 78 in step S2-6. Once the flip-flop 78 in FIG. 8A is cleared, the phase 2 timing circuit 76 generates a P2 LD A pulse in step S2-8 that energizes an OR gate 185 to produce a LD A pulse that loads the output of the multiplexer 85 in FIG. 8B into the A shift register 86 in parallel. As the MSF flip-flop 78 is cleared, the multiplexer 85 couples the cylinder address into the A shift register. Likewise, the MSG signal conditions the multiplexer 97 to apply the track and sector addresses in the form of TRK/SEC ADDRESS signals to the input of the B shift register 93.

After producing the LD A pulse, the phase 2 timing circuit 76 immediately generates a P2 LD B signal in step S2-9 which produces the LD B signal from an OR gate 186. The LD B pulse loads the B shift register 93 and initiates a sector search. Now the phase 2 timing circuit 76 delays in step S2-10 until it receives an HDR MATCH signal indicating that the addressed sector is positioned.

Figure 8C:
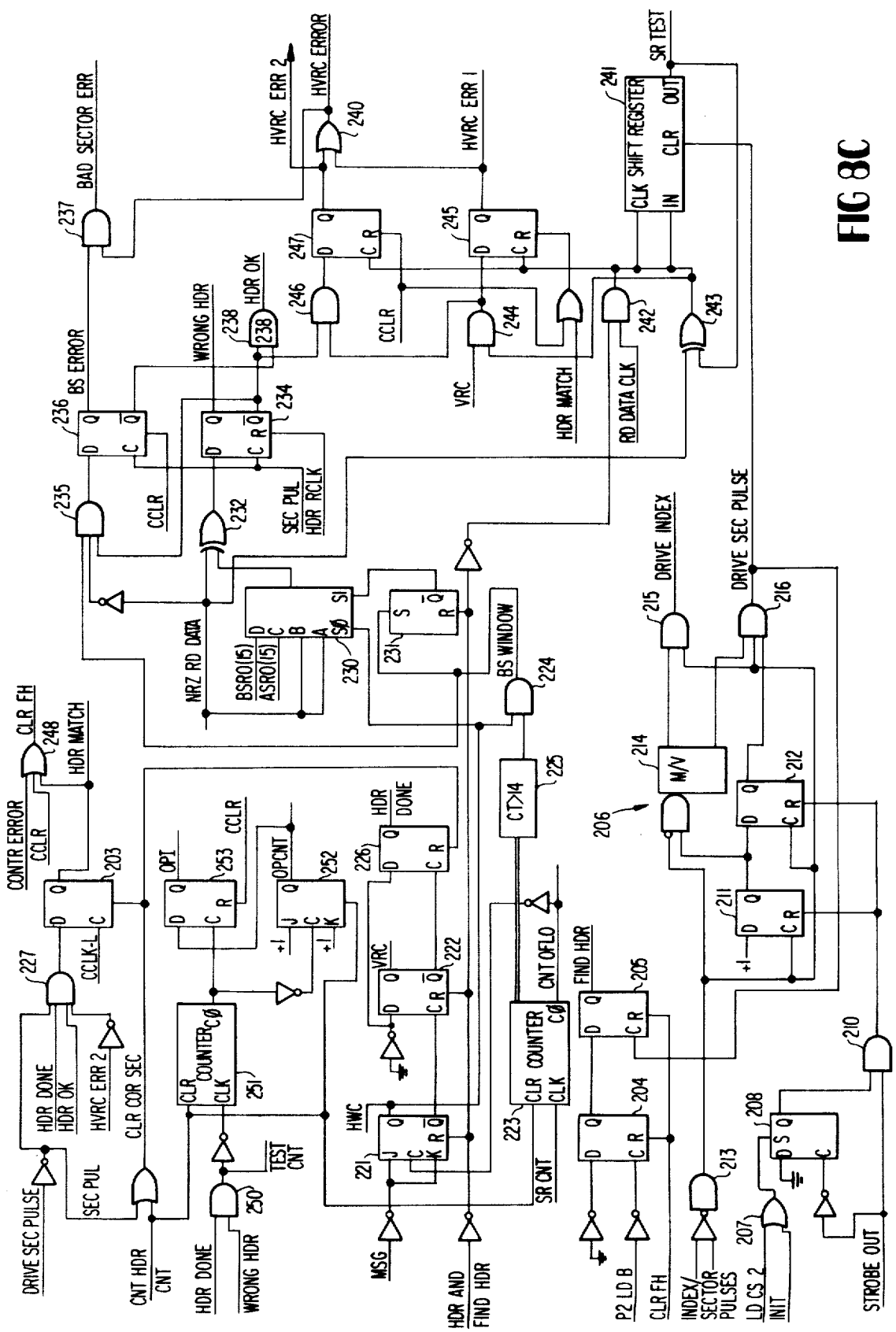

Circuitry for finding the correct sector is shown in FIGS. 8A and 8C. This circuitry analyzes the incoming data from the data heads. Once the addressed sector is positioned under the data heads 25 (FIG. 3) and is properly decoded, a flip-flop 203 in FIG. 8C generates an HDR MATCH signal and enables the phase 2 timing circuit 76 to transmit the COR SECTOR signal in step S2-11.

More specifically, the trailing edge of the P2 LD B pulse generated in step S2-9 sets a flip-flop 204. When the next sector appears at the data heads, a flip-flop 205 will set and transmit a FIND HDR signal that initiates the header searching operation.

As previously indicated, both index pulses and sector pulses appear on a common line. Index pulses are controlled to appear midway between two successive sector pulses. A separator circuit 206 shown in FIG. 6E and in detail in FIG. 8C separates the index and sector pulses. When the register decoder 56 in FIG. 6A transmits the LOAD CS2 pulse or the data transceiver 50 transmits the INIT signal, an OR gate 207 presets a flip-flop 208. This enables an AND gate 210 to be energized concurrently with the STROBE OUT signal from the flip-flop 100 in FIG. 8A. As a result, the AND gate 210 clears flip-flops 211 and 212. The trailing edge of the STROBE OUT signal clocks the flip-flop 208 to clear state and thereby removes the overriding clearing signals.

The first pulse that appears on the INDEX/SECTOR PULSES line passes through a receiver 213. The leading edge of this pulse sets the flip-flop 211. The trailing edge then triggers a one-shot monostable multivibrator circuit 214 thereby to define a time window during which an index pulse normally would occur. If the leading edge of the next pulse from the receiver 213 sets the flip-flop 212 while the multivibrator 214 is active, it is an index pulse and an AND gate 215 transmits the DRIVE INDEX pulse. On the other hand, if the multivibrator 214 is not active, an AND gate 216 generates a DRIVE SEC PUL pulse. It is the DRIVE SEC PUL pulse that sets the flip-flop 205 and generates the FIND HDR signal.

Sector timing circuitry 217 in the data module 24 shown in FIG. 6B generates a HEADER DATA signal when it decodes the presence of header information. When this signal appears in coincidence with the FIND HDR signal from the flip-flop 205, the AND gate 123 in FIG. 8A generates the HDR AND FIND HDR signal and removes an overriding clearing signal from HWC and VRC flip-flops 221 and 222 in FIG. 8C.

The RD DATA CLK pulses that are dependent upon the control data CLK pulses from the phase lock loop 114 in FIG. 8B also are applied to an AND gate 220 in FIG. 8A thereby to produce HDR AND RCLK pulses that advance the counter 83 thereby to count successive bits of data. The CNT OFLO signal therefore is generated after each word is received.

At the beginning of a header searching operation, the flip-flops 221 and 222 in FIG. 8C and the MSG flip-flop 78 in FIG. 8A are all cleared. A counter 223 is conditioned to be energized by the SR CNT pulses from the OR gate 120 in FIG. 8A, the counter 223 advancing in synchronism with the counter 83 in FIG. 8A. Although separate counters 83 and 223 are shown, only one such counter is actually used. Moreover the multiplexers 85 and 97 are conditioned to route the desired cylinder address into the A register and the desired sector and track addresses into the B register 93.

As the data, represented as NRZ RD DATA signals from the data separator 206 is received, it if shifted into header search logic 228 that is shown generally in FIG. 6D. In this specific embodiment, the header comprises three words. The first word contains the cylinder address for that sector; the second, the track and sector addresses for that sector plus two control bits that are always ONES and a format bit; the third, an exclusive OR combination of the first two words as a header check word. At the end of the first word, the trailing edge of the CNTO FLO from the counter 223 (or the counter 83) sets the HWC flip-flop 221 thereby conditioning an AND gate 224 so that it can be energized for the last two bits of the second word by a decoder circuit 225 that monitors the outputs of the counter 223. At the end of the second word, the CNT OFLO signal from the counter 223 clears the flip-flop 221 and sets the VRC flip-flop 222. At the end of the third word the HEADER DATA signal, that energizes the AND gate 123, shifts to a non-asserted state, so the HDR AND FIND HDR signal also shifts to a non-asserted state and clears the flip-flops 221 and 222. This sets an HDR DONE flip-flop 226. Thus, the foregoing circuitry identifies each of the three successive words.

The header data being transmitted into the header search logic in FIG. 8C is an NRZ RD data signal. These incoming NRZ RD DATA signals are compared in succession with the contents of the A and B shift registers 86 and 93 in FIG. 8B as selected by a multiplexer 230 in FIG. 8C. More specifically, a latch 231 is cleared concurrently with the flip-flop 221. The multiplexer 230 thereby is conditioned to couple the output signals from the A shift register to an exclusive OR circuit 232. The NRZ RD DATA signal constitutes the second input to that circuit. If the bits are identical, then the output from the exclusive OR circuit 232 is never asserted and the successive HDR AND RCLK pulses from the AND gate 220 in FIG. 8A cannot set a WRONG HDR flip-flop 234. At the end of the first word, the flip-flop 221 is cleared and this conditions the multiplexer 230 to convey the output from the B shift register 93 to the exclusive OR circuit 232. For the last two bits of the second word the BS WINDOW signal from the AND gate 224 becomes active and with the signal from the cleared flip-flop 234, enables an AND gate 235 to test the next two bits of data to determine if they are both ONES. If they are, a flip-flop 236 does not set, so a BS ERROR signal is not asserted. If the two bits contain one or two ZEROS, an AND gate 237 generates a BAD SECTOR ERR signal if it is enabled by an OR gate 240. Assuming that neither flip-flop 236 nor flip-flop 234 is set, an AND gate 238 generates an HDR OK signal indicating that the header words has been validly checked.

Simultaneously with the foregoing checking operation, the NRZ RD data signals are coupled to into a shift register 241 in response to RD DATA CLK pulses from an AND gate 242 that is enabled while the HDR AND FIND HDR signal is asserted. Initially, the shift register 241 is cleared by the DRIVE SEC PUL pulse from the AND gate 216. After the first word is entered, the second word in sucession is then combined with the corresponding bits in the first word as they are shifted out of the shift register 241 thereby to produce a header check word. At the end of the second word the flip-flop 222 sets and the resulting VRC signal enables an AND gate 244 to condition a flip-flop 245 so it sets only if the received check word and the check word in the shift register 241 are different. If they are not, the flip-flop 245 remains reset and an AND gate 246 and flip-flop 247 cannot produce an HVRC ERR 2 signal. Thus, if the DRIVE SEC PUL pulse is inactive and the HDR DONE signal from the flip-flop 226 is active, indicating that the entire header has been read, the HDR OK signal from the AND gate 238 is asserted and the HVRC ERR 2 signal from the flip-flop 247 is not asserted. Thus, the AND gate 227 conditions the flip-flop 203 so it is set on the trailing edge of the next CCLK pulse and generates the HDR MATCH signal. In addition an OR gate 248 generates a CLR FH signal which clears the flip-flops 204 and 205 thereby terminating the FIND HDR signal.

If a word check error occurs, the flip-flop 245 generates the HVRC ERR 1 signal, whether or not the header is the correct header. On the other hand, if it is the correct header and a check error is found, the flip-flop 247 sets and produces the HVRC ERR 2 signal which then inhibits the generation of the HDR MATCH signal.

Each time the HDR DONE signal is generated by the flip-flop 226, an AND gate 250 tests the WRONG HDR signal from the flip-flop 234. If both signals are active, the system clocks a counter 251. After a first predetermined number of headers are viewed, the counter 251 overflows and sets a flip-flop 252 thereby to enable a flip-flop 253 to be set if another overflow occurs. If the counter then processes another predetermined number of headers without receiving a valid header, the flip-flop 253 sets and generates an OPI signal that becomes one of the signals monitored in the register 166 shown in FIG. 7.

Referring again to FIG. 9B, and assuming that a header match is received, the HDR MATCH signal enables the phase 2 timing circuit 76 to generate a COR SECTOR signal in step S2-11 and increment the sector count in step S2-12 by incrementing a counter that comprises the five low-order bit positions of the disk address register 65. If a sector count overflow does not occur, then the system transfers back to step S2-2 and reads the next sector.

On the other hand, if the sector count overflow does occur, the track count is incremented in step S2-14 by advancing a counter that constitutes the stages TA0 through TA2 in the disk address register 65 (FIG. 7). If an overflow occurs, then the system clears the sector counter in step S2-16 and increments a cylinder counter which comprises the DC00 through DC09 positions of the desired cylinder register 64. When that counter overflows, step S2-17 diverts to step S2-18 to clear the track counter in the disk address register 65 and return to step S2-2 for further processing. If no counter overflow occurs the system clears the track counter in step S2-19 and then shifts to step S2-20 to await a POSTAMBLE signal which indicates a postamble portion of a sector has been received. The POSTAMBLE signal clears the CORRECT SECTOR signal and enables the phase 2 timing circuit 76 to test the drive word counter which forms a portion of the word count register 63 (FIG. 6C). If all the words have not been transferred between the disk drive and the controller, the phase 2 timing circuit 76 generates a JMP PH1 signal that sets the flip-flop 72 in FIG. 8A and thereby clears the phase 2 timing circuit 76. This enables another seeking operation to occur. On the other hand, if the drive work counter does overflow, the phase 2 timing circuit 76 generates a WAIT signal in step S2-22 and awaits the transmission of all the words from the silo memory 201 in FIG. 6B through the multiplexer 255 onto the system bus. When that operation is completed, there is another word count overflow, so the phase 2 timing circuit 76 generates an P2 SET READY signal that energizes the OR gate 166 in FIG. 8A.

Figure 9B:
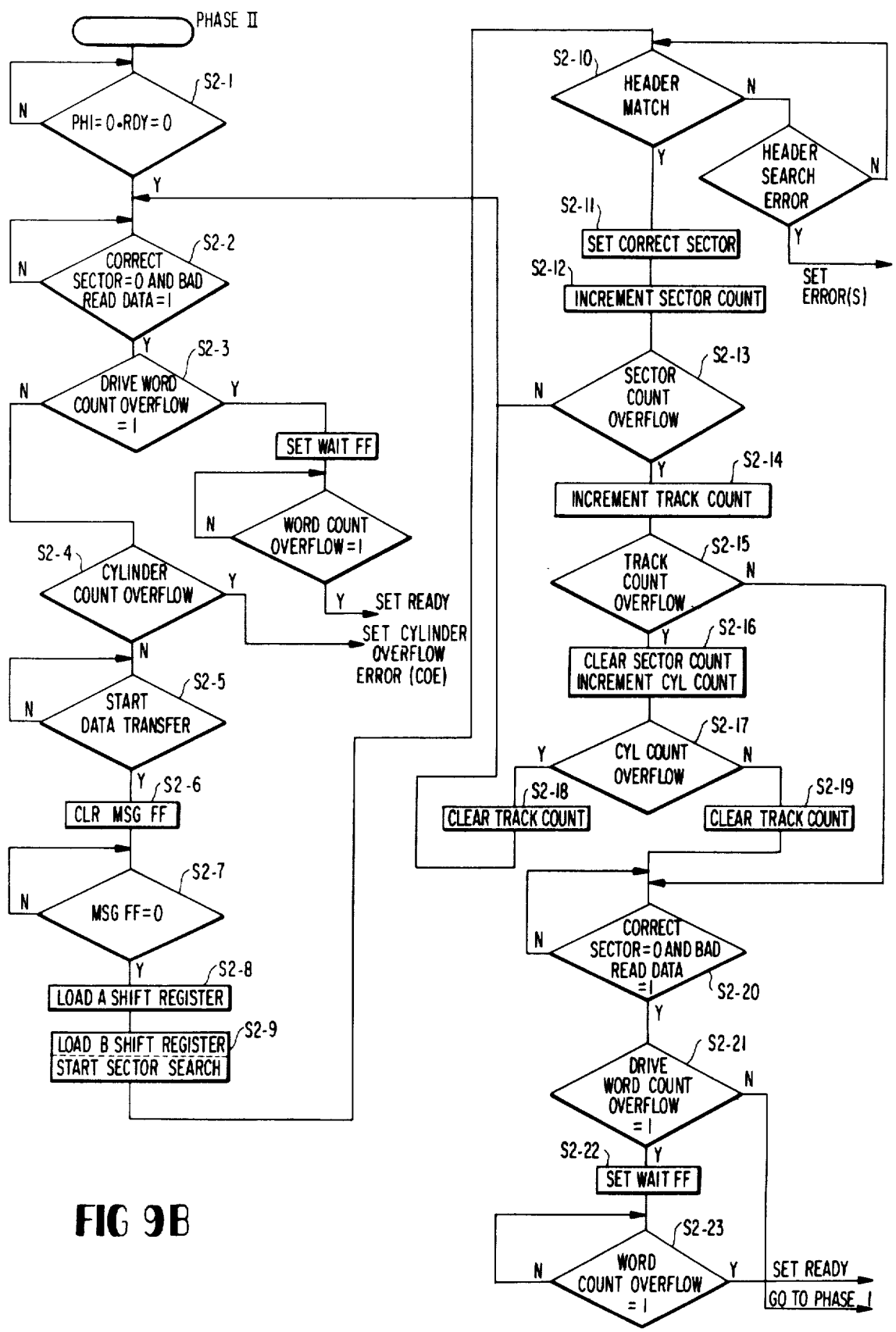

As apparent from FIG. 9B, if step S2-13 or step S2-17 branch back to step S2-2, then it is possible for all the words to have been transferred. Therefore, steps analogous to steps S2-22 and S2-23 are processed again. If there is a cylinder count overflow in Step S2-4, an ERROR condition exists, so the timing circuit 26 sets a COE stage in the ERROR register 166 (FIG. 7). Likewise if a search error occurs while waiting for a HEADER MATCH, various error flags including the HVRC stage in the ERROR register 166 shown in FIG. 7 also are set.

FIG. 6D illustrates the control circuitry used by the controller to monitor conditions in the disk drives connected to it. This circuitry is active at all times, except when the SEND ENABLE signal is asserted during the transmission of a control message to a disk drive. As apparent, the transmission of a control message can, and usually does, result in some change in the status of the selected drive, so it is possible to retrieve ambiguous information from the disk drive during these intervals.

More specifically, this circuitry includes a receiver that couples the POLLED ATTENTION line in the drive bus 15 into the controller. As previously indicated, the POLLED ATTENTION line is common to all disk drives. Therefore, the appearance of any signal on that line merely indicates that some disk drive has generated an ATTENTION signal. A poll address register 261 comprises a counter with a modulus that equals the number of disk drives that can be connected to the controller. In this specific embodiment eight disk drives can connect to a controller, so the poll address register 261 produces the binary identifying addresses 000 through 111 in a recurring sequence. These signals are coupled onto the drive bus 15 by transmitters 262, shown in FIG. 6E, as the POLL $2^0$ through $2^2$ signals.

These signals also control the handling of the received POLLED ATTENTION signal by the controller. The receiver 260 in FIG. 6E produces a signal on an ATTN LINE that connects to the input of an attention shift register 263. Each time the poll address register 261 changes the address, it shifts the contents of the shift register 263 and maintains a positional correspondence between the identified disk drive nd specific positions within the shift register 263. When the poll address register 261 completes an addressing sequence, it loads the signals in the shift register 263 into an attention status register 264 in parallel. Each bit position in the status register 264 corresponds to one of the disk drives. A multiplexer 265, controlled by the drive selection signals in a control message, then couples the corresponding stage in the attention status register 264 onto a SELCTD DR ATTN conductor that serves as one control input for the phase 1 timing circuit 75 in FIG. 8A.

3. Drive Operation

With this understanding of the operation of the controller, its response to signals from the system bus 12 and communications over the drive bus 15 to various disk drives 14 (FIG. 1), it now is possible to discuss in detail the operation of a disk drive to include its receipt of control messages from the controller and its transmission of status messages back to the controller.

Figure 11A:
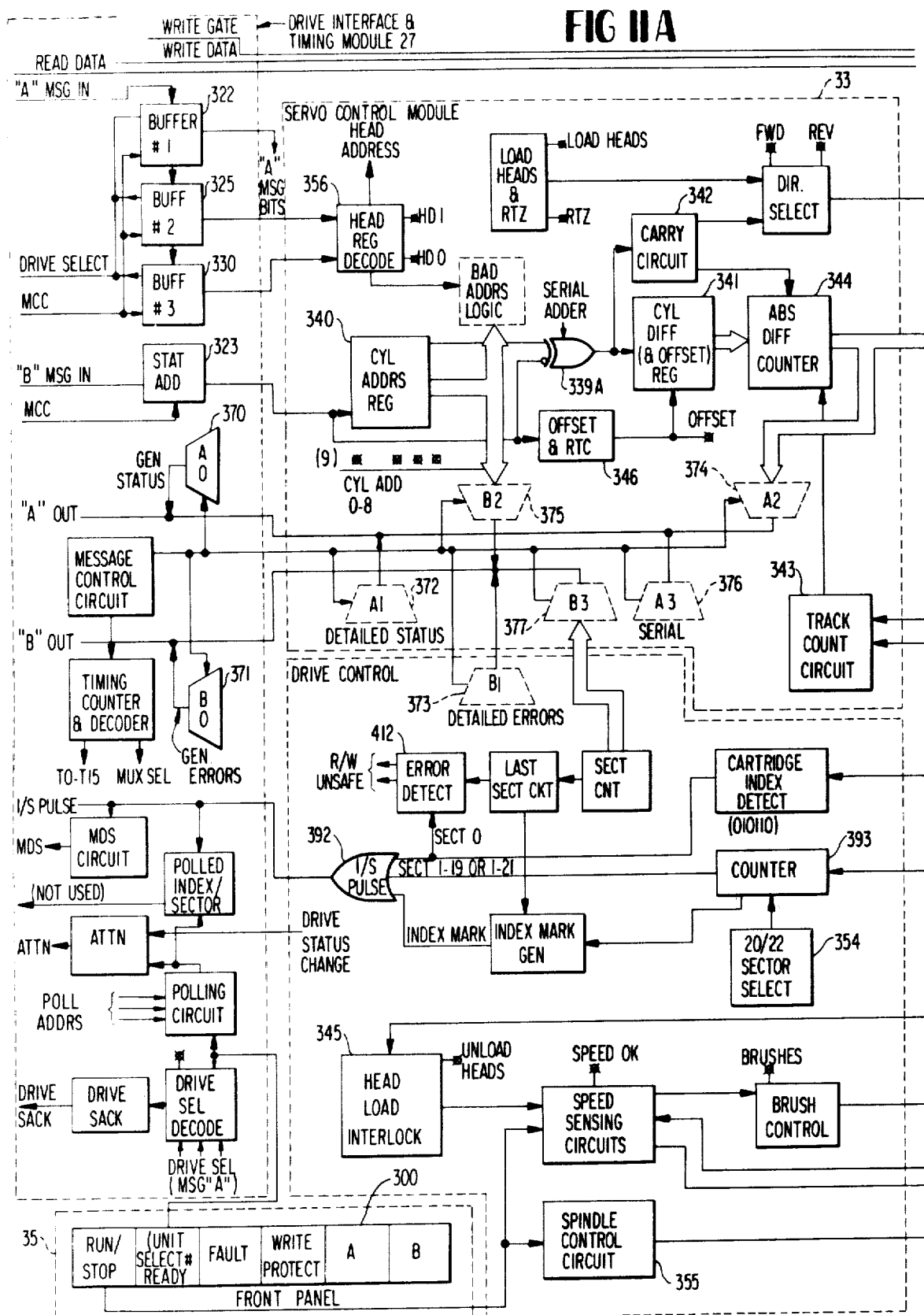
FIG. 11 comprises FIGS. 11A and 11B and is a detailed block diagram of the drive shown in FIG. 3.

When a disk drive is properly connected to controller, the CONTROLLER POWER ON signal from the controller is asserted. Referring to FIGS. 11 and 12A, when a drive access switch 300 that forms a portion of the panel control module 35 is energized, an AND gate 301 in FIG. 12A enables a number of circuits throughout the disk drive as becomes more apparent in the subsequent discussion.

Figure 12B:
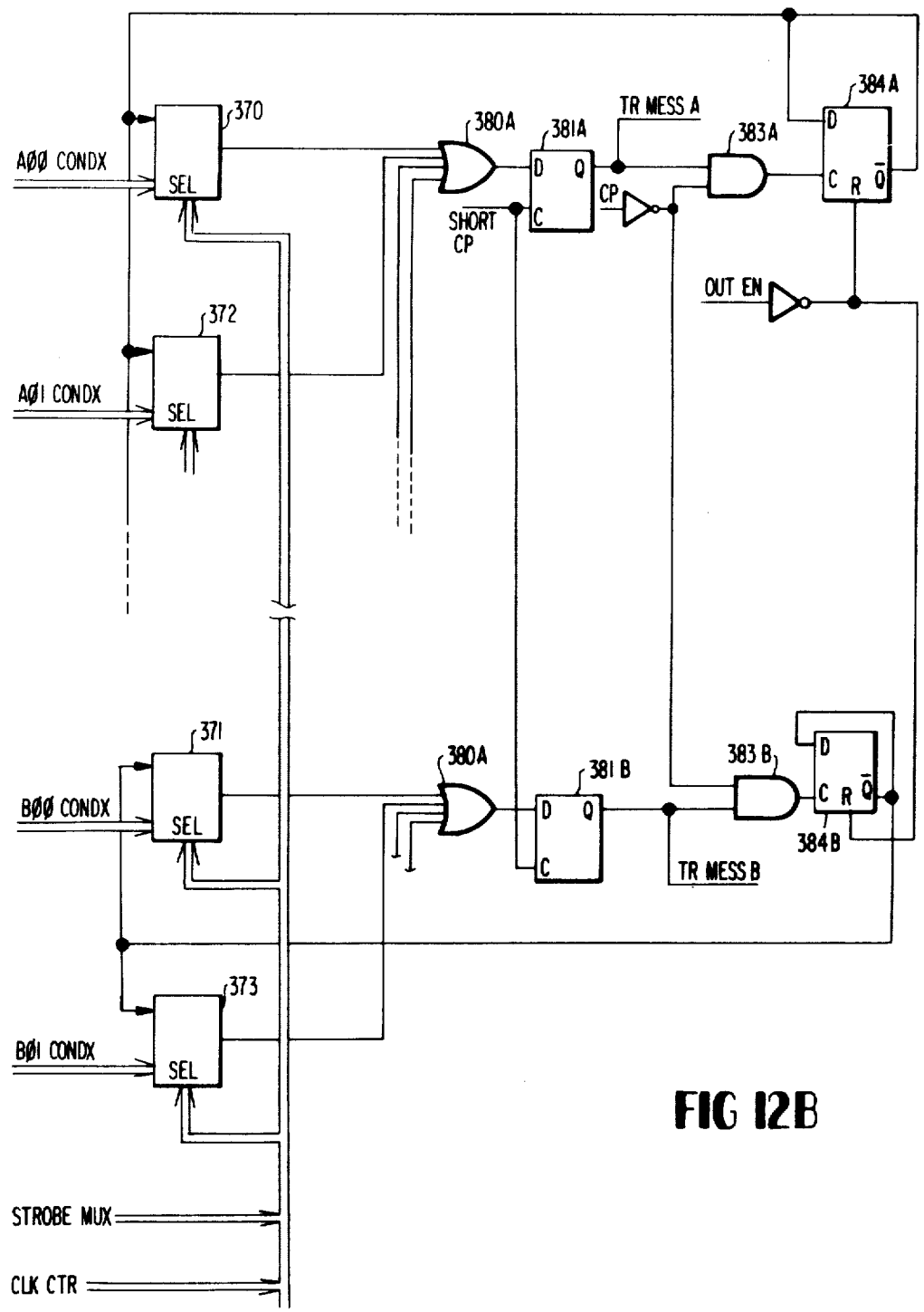
FIGS. 12A including FIGS. 12A1 and 12A2, and 12B comprise a detailed logic diagram of portions of the circuitry shown in FIG. 11.
Figure 13:
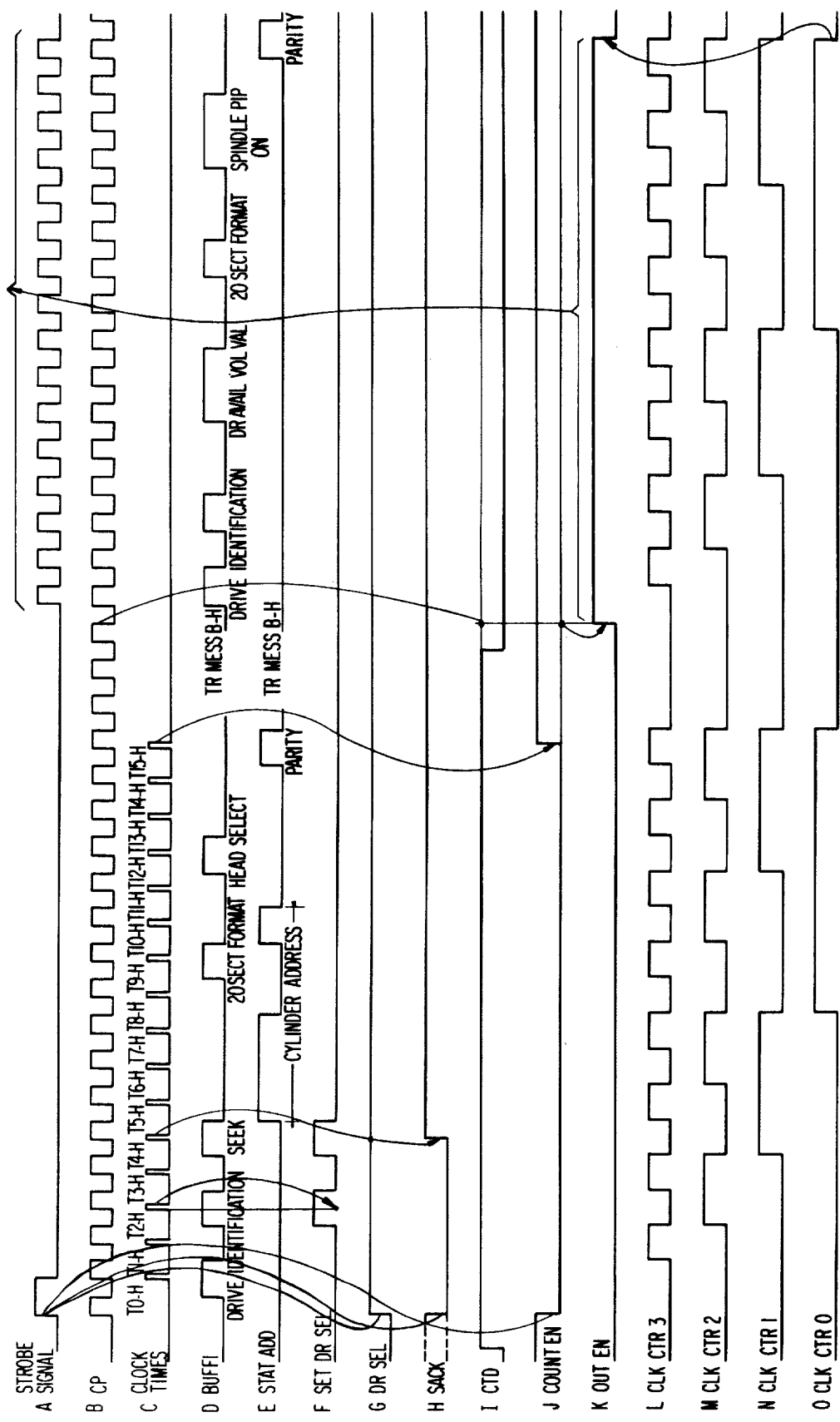
FIG. 13 is a timing diagram that is helpful in understanding the transfer of messages between a drive and a controller.

At the beginning of a control message transfer from the controller to the drive, the CTD signal on the drive bus 15 is asserted (Graph I in FIG. 13). A receiver 302 energizes an AND gate 303 that is enabled by the AND gate 301. The AND gate 303 then enables receivers 304 to pass the STROBE signal from the drive bus 15 to other portions of the circuitry in FIG. 12 as shown in Graph A of FIG. 13. When the drive receives the STROBE pulse, the signal from the receiver 304 presets a DR SEL flip-flop 305 (Graph G). As will be apparent, the STROBE and CTD signals are applied concurrently to all drives so all flip-flops corresponding to the flip-flop 305 in FIG. 12A are set simultaneously. The STROBE signal also clears a flip-flop 306 by means of an OR gate 307.

The DR SEL signal from the flip-flop 305 also energizes an OR gate 310 to clear an OUT EN flip-flop 311 (Graph E). This enables a counter 312 to advance, as an IN EN flip-flop 313 also is set by the STROBE pulse (Graph J). The IN EN signal also enables receivers 314 and 315 to produce binary signals corresponding, respectively, to the information on MESSAGE LINE A and MESSAGE LINE B.

Assuming that the DC power is at a proper value, so a DC LOW signal is not asserted, the DR SEL flip-flop 305 and the AND gate 301 enable receivers 316 to produce a CP pulse in response to each CONTROL CLOCK pulse received from the drive bus 15 as shown in Graph B in FIG. 13. The leading edge of each CP pulse triggers a one-shot monostable multivibrator circuit 320 thereby to produce a SHORT CP pulse.

A decoder 321 is disabled so long as the SHORT CP signal is not asserted or the STROBE signal is asserted. This decoder 321, when enabled, defines T0 through T15 time intervals in sequence in response to each CP pulse as shown in Graph G of FIG. 13. As the counter 312 is cleared during the first CP pulse the decoder 321 generates a T0 timing signal.

On the trailing edge of the first CP pulse, the signal appearing at the output of the receiver 314 and corresponding to the least significant position in message A is clocked into a flip-flop 322 (Graph D) that is a first flip-flop in a three-stage register. Simultaneously, the first bit in message B is loaded from the receiver 315 into a one-stage shift register comprising a flip-flop 323 (Graph E). The counter 312 also advances on the trailing edge of each CP pulse (Graphs L through O).

The leading edge of the next CP pulse triggers the one-shot monostable multivibrator 320 and the SHORT CP pulse defines a T1 interval (Graph C). During the second and third intervals, the next two bits on MESSAGE LINE A and MESSAGE LINE B, past through the receivers 314 and 315 into the flip-flops 322 and 323 respectively.

The trailing edges of the T0 and T1 timing pulses clock the signals from the STAT ADD flip-flop 323 into flip-flops 324 and 326 respectively. At the completion of the T1 pulse, these two flip-flops define the message that is to be returned and the decoder 327 generates one of several STROBE MUX 0-3 signals that are used in selecting the status message.

During the T2 interval, data is again shifted into the flip-flops 322 and 323. Upon completion of the interval, the flip-flops 322 and 325 and a third flip-flop 330 in the shift register contain the drive select code. A comparator 331 compares these signals with those derived from a drive identification circuit 332. If a correspondence exists, the trailing edge of the T2 timing pulse will clock the flip-flop 305, but it will remain set because the comparator asserts a SET DR SEL signal (Graph C).

If no comparison exists, then the flip-flop 305 will be cleared, and the disk drive no longer will respond to incoming signals. The shift of the DR SEL signal to a non-asserted state clears the flip-flop 313 to terminate the IN EN signal. Therefore, no further message signals can pass through the receivers 314, 315 and 316.

If MESSAGE A selects a drive that is to be deselected, the flip-flop 322 sets during the T3 time interval. The T3 timing pulse then energizes an AND gate 333 and an OR gate 334 to clear the DR SEL flip-flop 305 and effectively disconnect the disk drive from the controller.

If the drive is selected, the leading edge of the T4 timing pulse from the decoder 321 sets the flip-flop 306 enables a transmitter 335 to generate the SACK signal onto the drive bus 15 (Graph H).

When a cartridge is changed, it is necessary to issue a PACK ACKNOWLEDGE command. This command causes an AND gate 336 to set a VOL VAL flip-flop 337. However, if the flip-flop 337 is set and no positioning is occurring (as indicated by a non-asserted level of a PIP signal), the T4 timing pulse energizes an AND gate 338 and sets an ADD EN flip-flop 339 that enables a serial adder 339A in the servo control module 28 shown in FIG. 11. In addition, a SEEK flip-flop in a CYL ADDRS REG circuit 340 shown in FIG. 11 is set. If this condition exists, subsequent signals from the receivers 315 and the STAT ADD buffer 323 are coupled into the serial adder 339A to be compared with the address in the CYL ADDRS REG signal. The output of the adder 339A is coupled into a CYL DIFF (& OFFSET) register 341 and a carry circuit 342. The information in the register 341 defines the number of tracks to be moved while the information in the carry circuit indicates the direction of movement. The absolute difference is transferred into an ABS DIFF COUNTER 344. A track count circuit 343 clocks the ABS DIFF COUNTER 344 each time it crosses a track. Thus, when the counter 344 reaches zero the data heads 25 are properly positioned over the correct track. These address signals are loaded from the receiver 315 into the servo control module 28 during the T4 through T12 time intervals concurrently with the transfer of the message over MESSAGE LINE A. No further discussion of the operation of the circuitry in response to signals from MESSAGE LINE B is necessary.

If the flip-flop 322 in FIG. 12A is set during the T5 time interval in response to a RECALIBRATE command, the CYL ADDRS REG circuit 340 in FIG. 11 is cleared and an RTZ flip-flop in the servo control module 28 is set so that the servo control and servo analog modules 28 and 30 position the data heads 25 over a reference cylinder (normally cylinder 000).

If the flip-flop 322 sets during time interval T6, a head load interlock circuit 345 in FIG. 11 and other circuitry in the drive control module 33 turn on the spindle so it can come up to speed. Then the heads are loaded. This operation occurs in response to a START SPINDLE command.

Any time a writing operation is to occur, the receiver 314 will condition the flip-flop 322 to be set during the T7 interval. As a result, this signal will clear an offset flip-flop and the OFFSET & RTC circuit 346 in FIG. 11 and inhibit any further operation of the disk drive in response to an OFFSET command.

When the flip-flop 322 sets during time interval T8, an AND gate 350 in FIG. 12A is energized and produces two signals. A CLR ERR appears at the output of an OR gate 351; and a PU CLR ERR signal, at the output of an OR gate 352. The CLR ERR signal clears a number of error flags that are distributed throughout the drive including those in the drive control module 33. Likewise, the PU CLR ERR clears other flags such as a PAR ERR flip-flop 353.

The output signal from the buffer 322 during the T9 time interval will set or clear a FORMAT flip flop in a 20/22 sector selection circuit 354 that is shown in FIG. 11. This controls the generation of sector and index marks by the drive control module 33.

Setting the buffer 322 during the T10 time interval turns off the identified disk drive. More specifically, under this condition a spindle control circuit 355 unloads the heads and turns off the spindle.

As previously indicated, a PACK ACKNOWLEDGE command produces a message on message line A that sets the flip-flop 322 during the T11 time interval to preset the VOL VAL flip-flop 337.

During the T12 and T13 time intervals, the first and second buffer stages 322 and 325 receive the head selection code. The T14 timing signal then enables the HEAD REG DECODER circuit 356 to identify which of the particular data heads 25 has been selected.

As each signal is transferred into the disk drive over the message lines, it is monitored by a parity circuit. As shown in FIG. 12A, the output of the first buffer flip-flop 322 toggles to a flip-flop 360 in response to the SHORT CP signal, assuming the flip-flop 322 is set. Likewise, each SHORT CP pulse energizes AND gate 361 and toggles a flip-flop 362 if the STAT ADD flip-flop 323 is set. If the messages are received without any parity error, the flip-flops 360 and 362 are both set during the T14 time interval. Thus, an OR gate 363 is not energized on the trailing edge of a T15 timing pulse so the flip-flop 353 remains cleared. On the other hand, if the OR gate 363 is energized, indicating a parity error, the flip-flop 353 sets.

The trailing edge of the T15 timing pulse also clears the IN EN flip-flop 313 and thereby turns off the receivers and clears the flip-flops 322, 323, 325 and 330 and the counter 312.

Next the disk drive awaits the termination of the CTD signal from the controller. When this occurs, the AND gate 364 is energized, so the trailing edge of the next CP pulse sets the flip-flop 311 and transmits an OUT EN signal that turns on transmitters throughout the disk drive. Setting the flip-flop 311 also enables the clock counter 312 to advance, so the decoder 321 can generate another sequence of T0-T15 timing pulses.

Referring now to FIG. 12B, there are a number of registers formed by individual flip-flops and other circuits that are distributed throughout a disk drive. Typical locations are shown in FIG. 11 for circuits that are capable for gathering such information. They include multiplexers 370 and 371 in the drive interace and timing module 27 for receiving various signals that are used in encoding the A0 and B0 messages. Likewise, multiplexers 372 through 377 are used in providing the information necessary to generate three additional sets of status messages for a transmission back to the controller. The selection of a particular message is made by the decoder 327 in FIG. 12A as previously indicated.

As shown in FIG. 12B, the selection of a particular one of the inputs to appear at the output of any of the multiplexers 370 through 373 shown in that FIGURE depends upon the STROBE MUX signal and the CLK CTR signals from the counter 312 in FIG. 12A. Each pulse from the counter 312 selects one of the input signals represented as A00, A01, B00 and B01 CONDX signals. The circuitry for conveying these signals to MESSAGE LINE A and MESSAGE LINE B is the same. Therefore, only the unit associated with MESSAGE LINE A is examined in detail. However, we use the same reference numerals for both message lines distinguishing them by their suffices "A" and "B". With each clock pulse the output signal from the selected one of the multiplexers 370, 372 and any others energizes an OR gate 380A. The leading edge of a SHORT CP pulse then sets or clears the flip-flop 381 depending upon the state of the selected signal. The output from the flip-flop 381A is the TR MESS A signal that is applied to a transmitter 382A shown in FIG. 12A, that transmitter being energized when the DC signals are within proper values and the OUT EN flip-flop 311 is set. The trailing edge of the CP pulse energizes an AND gate 383A if the TR MESS A flip-flop 381 is set. Each ONE that is transmitted toggles a flip-flop 384A. Moreover the reset output of the flip-flop 384A is coupled back to the most significant bit position in the decoder 370 so that its value is transmitted as the last bit in the message. In this way, the parity bits are generated for transmission back to the controller where there are decoded as previously indicated.

There are some additional circuits that are shown in FIG. 12A for generating other signals over the drive bus. A transmitter 390 shown in FIG. 12A is enabled when the DC voltage is over a minimum level and the OUT EN flip-flop 311 is set. Each CP pulse from the receiver 316 energizes this transmitter so that the CP pulses are transmitted back to the circuit over the STROBE conductors as shown in FIG. 5 and in Graph A of FIG. 13.

Once a message has been completed, the next CP pulse advances the counter 312 to a zero state. At the time of the transition, a ONE output signal from the counter 312 clears a flip-flop 391. This flip-flop clears the OUT EN flip-flop 311.

It is necessary in this disk drive to insure that two disk drives connected to the same controller are not selected simultaneously. Assuming a normal operation, INDEX/SECTOR pulses from an OR gate 392 in the drive control module 33 are applied to circuitry shown in FIG. 12A including a transmitter 395 that is enabled by the DR SEL signal from the flip-flop 305 and, when set, by a flip-flop 396. Flip-flop 396 is normally reset when the flip-flop 305 is cleared. Selecting a particular drive, however, and setting the flip-flop 305 enables the flip-flop 396 to be set by a one-shot monostable multivibrator 397. More specifically, the trailing edge of each INDEX/SECTOR pulse triggers the monostable multivibrator 397 if the SACK flip-flop 306 is set. The pulse from the monostable multivibrator 397 then sets the flip-flop 396 and the disk drive can begin to transfer index and sector pulses onto the INDEX/SECTOR PULSES line.

During operation, each drive monitors the INDEX/SECTOR PULSES line and produces output signals at a receiver 400. These signals are used to clock a flip-flop 401 that is conditioned to be set if the INDEX/SECTOR pulse is not asserted when the receiver 400 is energized as this indicates another source of index and sector pulses. When this occurs, the flip-flop 401 sets and enables a transmitter 402 to transmit the MULTIPLE DRIVE SELECT signal that is returned to the controller. At the controller the signal is coupled to the multiplexer 144 in FIG. 6C as a MUL DR SEL signal.

All the time that the foregoing operations are occurring, the POLL $2^0$ through $2^2$ signals are being applied to receivers 403. A comparator 404 energizes an AND gate 405 so long as the comparator does not produce an OUT PUT signal thereby to maintain a flip-flop 406 in a cleared state. However, when the comparator 404 does assert a signal, it removes an overriding clearing signal from the flip-flop 406 and enables a monostable multivibrator 407 be triggered on the trailing edge of that time interval. This sets the flip-flop 406, and a transmitter 410 generates the ATTENTION signal if a DSC latch has been set. Any of monitored error conditions sets the latch 411, while the PU CLR ERR from the OR gate 352 clears that latch. Thus, a disk drive will transmit the ATTENTION signal only when the polling circuit in the controller so identifies it.

Referring again to FIG. 11, the transmission of actual data from header or data portions of the storage medium can be defined. A specific embodiment depicted in FIG. 11 is adapted for use with a modified frequency modulation system that is further characterized as a self-clocking continuous pulse procedure. Circuitry associated with the servo head 26 transmits CLOCKING signals from the servo track into a PLO circuit 414 to produce WRCLK pulses. As shown in FIG. 12A, these pulses are applied to a transmitter 415 that is enabled when the DC power is above a sufficient level and the SACK flip-flop 306 is set. In the controller, as shown in FIG. 6E, they are applied to the phase lock loop 114 thereby to synchronize the writing operation with the timing signals permanently recorded on the disks. During a writing operation, the controller also transmits a WRITE GATE signal that is received by a receiver 416. If any one of a number of conditions such as an unsafe condition, off-track condition or write lock condition exists, an AND gate 417 inhibits any actual writing operation. However, if the AND gate 417 is energized, incoming READ/WRITE DATA signals pass through a receiver 418 that is energized by the AND gate 417. The WR DATA signals are then coupled through the writing circuit to be applied to the appropriate one of the data heads 25.

During a reading operation, signals from the data heads 25 are coupled through a reading circuit 420 that includes, as a portion of a digital circuit 421, a transmitter 422. The RD DATA signals, that correspond to the information from the selected one of the data heads 25, produce READ/WRITE DATA signals in an AND gate 423 is energized. This AND gate is energized if the WRITE GAME signal is inactive, the drive is in a ready state and the drive is selected.

CONCLUSION

From the foregoing, it can be seen that the circuitry utilized to implement this invention is significantly simpler than many of the sophisticated systems that have been used commercially. Moreover, this simplification has been attained without unduly sacrificing response speed as the most significant factors that limit the transfer of data between a disk drive and its controller and other parts of a data processing system are the velocity of the medium itself and the density of the data on that medium. The reasons for the simplification are now apparent as significantly less hardware is necessary in a facility that incorporates this invention. All parallel to serial conversion is accomplished in the controller and, as a controller normally operates with only one drive during a transfer, there is no great loss of data throughput.

This invention also has been described with specific reference to a particular embodiment. It will be apparent from the foregoing that there are many ways to implement this invention by altering some of the circuitry. Moreover, this invention has been described in terms of a particular data processing system. It can be used with any data processing system, assuming that the appropriate changes are made to compensate for any differences in the signals that characterize such a data processing system. Therefore, it is an object of the appended claims to cover all such variations and modifications as come within the true spirit and scope of this invention.

What we claim as new and desire to secure by Letters Patent of the United States is:

1. A drive for use in a secondary storage facility that includes a controller for controlling the operation of said drive and a drive bus for conveying signals between said drive and the controller, the controller and said drive each including means for transferring data therebetween over the drive bus and each including means for transferring control information therebetween over the drive bus, the controller additionally including means for transmitting, concurrently with and independently of other operations in the facility and in cyclic fashion, a sequence of polling signals to the drive over polling lines of the drive bus, said drive comprising:
   A. means for monitoring predetermined conditions in said drive,
   B. means responsive to said monitoring means for generating a status signal whenever one of the predetermined conditions is changed,
   C. means for generating a polling address for said drive,
   D. means connected to said polling signal address generating means and connectible to the drive bus for generating a selection signal when the polling signals correspond to the polling address for said drive, and
   E. means responsive to the status signal on the selection signal for transmitting an ATTENTION signal onto a corresponding line of the drive bus that is transmitted to the controller.

2. A drive as recited in claim 1 wherein said selection signal generating means includes:
   i. receiver means connectible to the drive bus for producing signals that correspond to the polling signals on the drive bus, and
   ii. comparison means for generating the selection signal when the signals from said receiver means correspond to the identifying address.

3. A drive as recited in claim 2 wherein said drive additionally comprises means for generating a signal indicating the operating status of said drive and said attention signal transmitting signal means includes a timing means enabled by the selection signal and the operating status signal for defining an interval during which the polling signals identify said drive, said timing means enabling said attention signal transmitting means.

4. A drive as recited in claim 3 wherein said timing means includes a monostable multivibrator means triggered by the selection signal and bistable storage means that are set to an enabling state by said monostable multivibrator means upon the coincidence of the selection signal and the operating status signal thereby to enable said transmitter means.

* * * * *

UNITED STATES PATENT AND TRADEMARK OFFICE
CERTIFICATE OF CORRECTION

PATENT NO. : 4,144,583

DATED : March 13, 1979

INVENTOR(S) : Lawson and Richesson

Page 1 of 2

It is certified that error appears in the above-identified patent and that said Letters Patent are hereby corrected as shown below:

```
Col  2, Line 23, insert after "overall" --operating--.
Col. 5, Line 52, delete "TO" and insert --T0--.
Col. 6, Line 39, delete "is" and insert --in--.
Col. 7, Line 35, delete "AO" and insert --A0--.
Col. 7, Line 37, delete "BO" and insert --B0--.
Col. 8, Line 12, after "i.e." insert a comma --,--.
Col. 9, Line 45, delete "Singals" and insert --Signals--.
Col. 10, Line 6, delete "MSOO" and insert --MS00--.
Col. 10, Line 6, delete "MSO3" and insert --MS03--.
Col. 10, Line 41, delete "tranceivers" and insert --transceivers--.
Col. 10, Line 67, delete "09" and insert --80--.
Col. 11, Line 12, delete "IN" and insert --in--.
Col. 11, Line 31, delete "resigter" and insert --register--.
Col. 11, Line 31, delete "83" and insert --93--.
Col. 12, Line 4, delete "MSG lines"" and insert --MSG CLK pulse--.
Col. 12, Line 26, delete "CO" and insert --C0--.
Col. 13, Line 13, after "contains" insert --a--.
Col. 13, Line 42, delete "flip flop" and insert --flip-flop--.
Col. 16, Line 10, delete "MSF" and insert --MSG--.
Col. 17, Line 26, delete "if" and insert --is--.
Col. 18, Line 18, delete "sucession" and insert --succession--.
Col. 20, Line 5, delete "nd" and insert --and--.
Col. 20, Line 66, delete "TO" and insert --T0--.
Col. 21, Line 2, delete "TO" and insert --T0--.
Col. 22, Line 42, delete "flip flop" and insert --flip-flop--.
```

UNITED STATES PATENT AND TRADEMARK OFFICE
CERTIFICATE OF CORRECTION

PATENT NO. : 4,144,583
DATED : March 13, 1979
INVENTOR(S) : Lawson and Richesson It is certified that error appears in the above-identified patent and that said Letters Patent are hereby corrected as shown below:

Col. 23, Line 22, delete "interace" and insert --interface--.
Col. 23, Line 60, delete "there" and insert --they--.
Col. 25, Line 16, delete "in" and insert --if--.

Signed and Sealed this

Tenth Day of June 1980

[SEAL]

Attest:

SIDNEY A. DIAMOND

Attesting Officer

Commissioner of Patents and Trademarks